United States Patent
Buckley et al.

(10) Patent No.: US 10,912,017 B2
(45) Date of Patent: *Feb. 2, 2021

(54) GATEWAY SELECTION CONTROLLED BY NETWORK

(71) Applicant: BlackBerry Limited, Waterloo (CA)

(72) Inventors: Adrian Buckley, Tracy, CA (US); Jan Hendrik Lucas Bakker, Fort Worth, TX (US); Nicholas James Russell, Newbury (GB)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/376,332

(22) Filed: Apr. 5, 2019

(65) Prior Publication Data
US 2019/0230586 A1 Jul. 25, 2019

Related U.S. Application Data

(63) Continuation of application No. 15/254,018, filed on Sep. 1, 2016, now Pat. No. 10,425,887.
(Continued)

(51) Int. Cl.
*H04W 4/00* (2018.01)
*H04W 48/18* (2009.01)
(Continued)

(52) U.S. Cl.
CPC .......... *H04W 48/18* (2013.01); *H04B 1/3816* (2013.01); *H04L 61/1511* (2013.01);
(Continued)

(58) Field of Classification Search
CPC ..... H04W 4/06; H04W 8/24; H04W 72/0453; H04W 88/04; H04W 48/16; H04W 48/18;
(Continued)

(56) References Cited

U.S. PATENT DOCUMENTS 6,885,658 B1 * 4/2005 Ress ...................... H04L 12/66
370/352
8,401,028 B2 * 3/2013 Mihaly ............... H04L 67/1008
370/400

(Continued)

FOREIGN PATENT DOCUMENTS

EP 1587272 10/2005
EP 2205040 7/2010
(Continued)

OTHER PUBLICATIONS

Aboba, B., et al., "Extensible Authentication Protocol (EAP)", Network Working Group Request for Comments: 3748, Jun. 2004, pp. 1-67.
(Continued)

*Primary Examiner* — Mahendra R Patel
(74) *Attorney, Agent, or Firm* — Conley Rose, P.C.; J. Robert Brown, Jr.

(57) ABSTRACT

A method, computer program product and a user equipment (UE) are provided for assisting a user equipment (UE) in selecting a network function. A first message is received from the UE. The first message includes UE request capabilities. A second message is sent to the UE. The second message includes an indication that promotes the UE attempting to connect to a particular Public Land Mobile Network (PLMN) using a network function belonging to the particular PLMN.

14 Claims, 8 Drawing Sheets

Related U.S. Application Data

(60) Provisional application No. 62/253,636, filed on Nov. 10, 2015.

(51) Int. Cl.
*H04L 29/12* (2006.01)
*H04W 76/10* (2018.01)
*H04B 1/3816* (2015.01)
*H04W 48/16* (2009.01)
*H04W 84/04* (2009.01)
*H04W 88/06* (2009.01)
*H04W 88/16* (2009.01)

(52) U.S. Cl.
CPC ......... *H04L 61/2015* (2013.01); *H04W 48/16* (2013.01); *H04W 76/10* (2018.02); *H04L 61/6054* (2013.01); *H04W 84/042* (2013.01); *H04W 88/06* (2013.01); *H04W 88/16* (2013.01)

(58) Field of Classification Search
CPC ........... H04W 52/243; H04W 72/0446; H04W 24/10; H04W 88/06; H04W 84/042; H04W 88/16; H04W 76/10; H04L 12/803; H04L 5/14; H04L 1/1861; H04L 5/0055; H04L 61/6054; H04L 61/1511; H04L 61/2015; H04B 1/3816
USPC ............ 370/312, 229, 254; 455/435.2, 456.1
See application file for complete search history.

(56) References Cited

U.S. PATENT DOCUMENTS

| | | | |
|---|---|---|---|
| 8,917,662 B2 | 12/2014 | Kim et al. | |
| 9,503,970 B2 | 11/2016 | Horn et al. | |
| 2003/0171112 A1 | 9/2003 | Lupper et al. | |
| 2005/0108430 A1* | 5/2005 | Howarth | H04L 63/083 709/245 |
| 2005/0215246 A1 | 9/2005 | Soderbacka et al. | |
| 2006/0095954 A1* | 5/2006 | Buckley | H04W 48/18 726/2 |
| 2007/0004402 A1* | 1/2007 | Buckley | H04W 48/16 455/432.1 |
| 2007/0171881 A1* | 7/2007 | Zhang | H04W 48/16 370/338 |
| 2007/0242601 A1 | 10/2007 | Gbadegesin et al. | |
| 2009/0047947 A1* | 2/2009 | Giaretta | H04W 48/17 455/432.1 |
| 2009/0270099 A1* | 10/2009 | Gallagher | H04W 8/08 455/435.1 |
| 2009/0285179 A1* | 11/2009 | Jones | H04W 28/08 370/331 |
| 2010/0046502 A1 | 2/2010 | Lei et al. | |
| 2010/0054222 A1* | 3/2010 | Rune | H04L 29/12132 370/338 |
| 2010/0211628 A1* | 8/2010 | Shah | H04W 48/17 709/203 |
| 2011/0149742 A1* | 6/2011 | Joensuu | H04W 92/14 370/241 |
| 2011/0200045 A1* | 8/2011 | Baehre | H04L 12/4633 370/392 |
| 2011/0249595 A1* | 10/2011 | Rozov | H04L 12/22 370/259 |
| 2011/0261787 A1 | 10/2011 | Bachmann et al. | |
| 2012/0189016 A1* | 7/2012 | Bakker | H04W 76/11 370/401 |
| 2012/0246325 A1* | 9/2012 | Pancorbo Marcos | H04L 63/102 709/227 |
| 2012/0269082 A1* | 10/2012 | Morper | H04L 43/10 370/252 |
| 2012/0294444 A1* | 11/2012 | Feng | H04L 63/06 380/270 |
| 2013/0208696 A1* | 8/2013 | Garcia Martin | H04W 36/14 370/331 |
| 2013/0265954 A1* | 10/2013 | Dahlen | H04W 48/14 370/329 |
| 2013/0265997 A1* | 10/2013 | Gu | H04W 12/0401 370/338 |
| 2013/0281064 A1* | 10/2013 | Hedberg | H04W 12/08 455/411 |
| 2014/0071854 A1* | 3/2014 | Xiang | H04W 48/18 370/254 |
| 2014/0153559 A1* | 6/2014 | Roeland | H04L 61/305 370/338 |
| 2014/0198637 A1* | 7/2014 | Shan | H04W 52/244 370/229 |
| 2014/0200000 A1* | 7/2014 | Jin | H04W 48/18 455/435.2 |
| 2014/0355417 A1* | 12/2014 | Kim | H04L 41/0654 370/221 |
| 2015/0043534 A1* | 2/2015 | Shirota | H04W 84/042 370/331 |
| 2015/0109930 A1* | 4/2015 | Duan | H04W 28/10 370/235 |
| 2015/0109967 A1* | 4/2015 | Hogan | H04M 15/44 370/259 |
| 2015/0195864 A1* | 7/2015 | Bartolome Rodrigo | H04L 65/1073 370/221 |
| 2015/0207777 A1 | 7/2015 | Chilla et al. | |
| 2015/0245256 A1* | 8/2015 | Kiss | H04W 12/06 455/436 |
| 2016/0007191 A1* | 1/2016 | Perras | H04L 61/1588 370/328 |
| 2017/0135031 A1 | 5/2017 | Buckley et al. | |

FOREIGN PATENT DOCUMENTS

| | | | | |
|---|---|---|---|---|
| EP | 2205040 A1 * | 7/2010 | ............ | H04W 48/17 |
| EP | 2509347 A2 * | 10/2012 | ............ | H04W 36/14 |
| EP | 2728802 A1 | 5/2014 | | |
| EP | 3193542 A1 * | 7/2017 | ............ | H04W 8/08 |
| WO | 2006053420 A1 | 5/2006 | | |
| WO | 2008060208 | 5/2008 | | |
| WO | WO-2010130088 A1 * | 11/2010 | ............ | H04W 48/18 |
| WO | WO-2011160682 A1 * | 12/2011 | ............ | H04W 36/14 |
| WO | 2012168146 | 12/2012 | | |
| WO | WO-2012168146 A1 * | 12/2012 | ............ | H04L 61/305 |
| WO | WO-2012175140 A1 * | 12/2012 | ............ | H04W 48/17 |
| WO | 2013189217 A1 | 12/2013 | | |
| WO | 2014067711 A1 | 5/2014 | | |
| WO | WO-2015026633 A1 * | 2/2015 | | |
| WO | 2015045296 | 4/2015 | | |
| WO | WO-2016095974 A1 * | 6/2016 | ............ | H04W 36/32 |

OTHER PUBLICATIONS

Arkko, J., et al., "Extensible Authentication Protocol Method for 3rd Generation Authentication and Key Agreement (EAP-AKA)", Network Working Group Request for Comments: 4187, Jan. 2006, pp. 1-79.

Haverinen, E., et al., "Extensible Authentication Protocol Method for Global System for Mobile Communications (GSM) Subscriber Identity Modules (EAP-SIM)", Network Working Group Request for Comments: 4186, Jan. 2006, pp. 1-92.

Arkko, J., et al., "Improved Extensible Authentication Protocol Method for 3rd Generation Authentication and Key Agreement (EAP-AKA')", Network Working Group Request for Comments: 5448, May 2009, pp. 1-29.

3GPP, "3GPP TS 24.008: Mobile radio interface Layer 3 specification; Core network protocols; Stage 3", http://www.3gpp.org/dynareport/24008.htm, last visited on Jul. 27, 2016, pp. 1-7.

3GPP, "3GPP TS 24.301: Non-Access-Stratum (NAS) protocol for Evolved Packet System (EPS)", http://www.3gpp.org/dynareport/24301.htm, last visited on Jul. 27, 2016, pp. 1-7.

(56) References Cited

OTHER PUBLICATIONS

3GPP, "3GPP TS 24.302: Access to the 3GPP Evolved Packet Core (EPC) via non-3GPP access networks", http://www.3gpp.org/dynareport/24302.htm, last visited on Jul. 27, 2016, pp. 1-6.
3GPP, "3GPP TS 24.229: IP multimedia call control protocol based on Session Initiation Protocol (SIP) and Session Description Protocol (SDP); Stage 3",http://www.3gpp.org/dynareport/24229.htm, last visited on Jul. 27, 2016, pp. 1-15.
Author Unknown, "S3i150344: "Reply LS to Incoming liaison GSMA LS on ePDG selection" S3i150210", https://portal.3gpp.org/ngppapp/CreateTdoc.aspx?mode=view&contributionId=662093, last visited on Jul. 27, 2016, p. 1.
3GPP, "3GPP TS 23.402: Architecture enhancements for non-3GPP accesses", http://www.3gpp.orn/DynaReport/23402.htm, last visited on Jul. 27, 2016, pp. 1-7.
3GPP, "3GPP TS 29.212: Policy and Charging Control (PCC); Reference points" , http://www.3gpp.org/DynaReport/29212.htm, last visited on Jul. 27, 2016, pp. 1-9.
3GPP, "3GPP TS 29.272: Evolved Packet System (EPS); Mobility Management Entity (MME) and Serving GPRS Support Node (SGSN) related interfaces based on Diameter protocol", http://www.3gpp.org/DynaReport/29272.htm, last visited on Jul. 27, 2016, pp. 1-7.
3GPP, "3GPP TS 24.312: Access Network Discovery and Selection Function (ANDSF) Management Object (MO)", http://www.3gpp.org/dynareport/24312.htm, last visited on Jul. 27, 2016, pp. 1-5.
Alexander, S, et al., DHCP Options and BOOTP Vendor Extensions, Request for Comments: 3132, Mar. 1997, https://www.ietf.org/rfc/rfc2132.txt, pp. 1-39.
3GPP, "3GPP TS 23.122: Non-Access-Stratum (NAS) functions related to Mobile Station (MS) in idle mode", http://www.3gpp.org/DynaReport/23122.htm, last visited on Jul. 27, 2016, pp. 1-7.
802.11-2012, "Part 11: Wireless LAN Medium Access Control (MAC) and Physical Layer (PHY) Specifications", IEEE Standard for Information Technology—Telecommunications and information exchange between systems Local and Metropolitan Area Networks—Specific Requirements, http://standards.ieee.org/findstds/standard/802.11-2012.html, last visited on Jul. 27, 2016, pp. 1-2.
C1-153983, "Selection of ePDG based on home operator preference", Proceedings of 3GPP TSG-CT WG1 Meeting #94, Belgrade, Serbia, Oct. 12-16, 2015, pp. 1-10.
3GPP TS 31.102, "Characteristics of the Universal Subscriber Identity Module (USIM) application", http://www.3gpp.org/dynareport/31102.htm, last visited on Jul. 27, 2016, pp. 1-12.
Communication pursuant to Article 94(3) EPC issued for European patent application No. 16770821.3 dated Feb. 8, 2019.
3rd Generation Partnership Project: "3GPP TS 23.401 V8.2.0 (Jun. 2008); 3rd Generation Partnership Project; Technical Specification Group Services and System Aspects; General Packet Radio Service (GPRS) enhancements for Evolved Universal Terrestrial Radio Access Network (E-ULTRAN) access (Release 8)", Internet Citation, Jun. 9, 2008, pp. 1-182, XP002508813, retrieved From the internet: url:HTTPP//www.3gpp.org/ftp/Specs/archive/23_series/ 23.401/23401-820.zip, retrieved on Dec. 23, 2008.
Communication pursuant to Article 94(3) EPC dated Oct. 2, 2019 for European Patent Application No. 16770821.3.
Communication pursuant to Article 94(3) EPC dated May 25, 2020 for European Patent Application No. 16770821.3.
3GPP TS 23.122 V133.0; 3rd Generation Partnership Project; Technical Specification Group Core Network and Terminals; Non-Access-Stratum (NAS) Functions Related to Mobile Station (MS) in Idle Mode; Release 13; Sep. 2015; 49 pages.
3GPP TS 23.402 V13.3.0; 3rd Generation Partnership Project; Technical Specification Group Services and System Aspects; Architecture Enhancements for Non-3GPP Accessses; Release 13; Sep. 2015; 298 pages.
3GPP TS 24.008 V13.3.0; 3rd Generation Partnership Project; Technical Specification Group Core Networks and Terminals; Mobile Radio Interface Layer 3 Specification; Core Network Protocols; Stage 3; Release 13; Sep. 2015; 727 pages.
3GPP TS 24.229 V13.3.1; 3rd Generation Partnership Project; Technical Specification Group Core Network and Terminals; IP Multimedia Call Control Protocol Based on Session Initiation Protocol (SIP) and Session Description Protocol (SDP); Stage 3; Release 13; Sep. 2015; 897 pages.
3GPP TS 24.301 V13.3.0; 3rd Generation Partnership Project; Technical Specification Group Core Network and Terminals; Non-Access-Stratum (NAS) Protocol for Evolved Packet System (EPS); Stage 3; Release 13; Sep. 2015; 394 pages.
3GPP TS 24.302 V13.3.0; 3rd Generation Partnership Project; Technical Specification Group Core Network and Terminals; Access to the 3GPP Evolved Packet Core (EPC) via Non-3GPP Access Networks; Stage 3; Release 13; Sep. 2015; 120 pages.
3GPP TS 24.312 V13.0.0; 3rd Generation Partnership Project; Technical Specification Group Core Network and Terminals; Access Network Discovery and Selection Function (ANDSF); Management Object (MO); Release 13; Sep. 2015; 382 pages.
3GPP TS 29.212 V13.3.0; 3rd Generation Partnership Project; Technical Specification Group Core Network and Terminals; Policy and Charging Control (PCC); Reference Points; Release 13; Sep. 2015; 237 pages.
3GPP TS 29.272 V13.3.0; 3rd Generation Partnership Project; Technical Specification Group Core Network and Terminals; Evolved Packet System (EPS); Mobility Management Entity (MME) and Serving GPRS Support Node (SGSN) Related Interfaces Based on Diameter Protocol; Release 13; Sep. 2015; 141 pages.
3GPP TS 31.102 V13.1.0; 3rd Generation Partnership Project; Technical Specification Group Core Network and Terminals; Characteristics of the Universal Subscriber Identity module (USIM) Application; Release 13; Sep. 2015; 254 pages.
"IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications"; IEEE Computer Society; IEEE Std 802.11; Mar. 29, 2012; 2793 pages.
Office Action dated Aug. 9, 2017; U.S. Appl. No. 15/254,018 filed Sep. 1, 2016; 31 pages.
Notice of Allowance dated Mar. 26, 2018; U.S. Appl. No. 15/254,018 filed Sep. 1, 2016; 18 pages.
Notice of Allowance dated Jun. 29, 2018; U.S. Appl. No. 15/254,018 filed Sep. 1, 2016; 23 pages.
Notice of Allowance dated Apr. 9, 2019; U.S. Appl. No. 15/254,018 filed Sep. 1, 2016; 30 pages.
Notice of Allowance dated Jun. 3, 2019; U.S. Appl. No. 15/254,018 filed Sep. 1, 2016; 4 pages.
PCT International Search Report; Application No. PCT/US2016/050243; Dec. 5, 2016; 4 pages.
PCT Written Opinion of the International Searching Authority; Application No. PCT/US2016/050243; Dec. 5, 2016; 5 pages.

* cited by examiner

GATEWAY SELECTION CONTROLLED BY NETWORK

CROSS-REFERENCE TO RELATED APPLICATIONS

This application a continuation application of U.S. patent application Ser. No. 15/254,018, filed Sep. 1, 2016 and entitled "Gateway Selection Controlled by Network," which is based upon and claims priority from prior U.S. Provisional Patent Application No. 62/253,636, filed on Nov. 10, 2015, the disclosure of each of which is herein incorporated by reference in its entirety.

BACKGROUND

Technical Field

The present disclosure generally relates to cellular network selection and more specifically to cellular network selection for a 3GPP device/user equipment (UE) to access an Enhanced Packet Core (EPC) via an access network that is not a 3GPP defined access network.

Description of the Related Arts

A Voice over Wi-Fi (VoWiFi) call requires connection to an Evolved Packet Data Gateway (ePDG), which in turn needs to be selected by the UE. In addition, Public Land Mobile Networks (PLMNs) may have Lawful Intercept (LI) obligations that they are compelled to respect by laws in the jurisdictions in which the PLMN operates. Therefore, when the UE roams into a country or region or legal jurisdiction that is not belonging to the UE's Home PLMN (HPLMN), there may be LI obligations that need to be met and require the UE to select and establish a connection to an ePDG residing in a Visited PLMN (VPLMN) within the visited country/legal jurisdiction. Problems arise in enforcing the obligations by the HPLMN, the VPLMN or both.

There is currently no means defined in existing standards whereby the VPLMN can inform the UE, or the UE verify with the VPLMN, whether the UE can be allowed to select a HPLMN ePDG instead of a VPLMN ePDG. There is also no behavior defined for what the UE is to do upon receipt of this information.

The lack of a means for verification presents several problems. For example, it is not known how the UE can be instructed to select an ePDG in the VPLMN by the VPLMN when the UE has attached (i.e. has a Registered PLMN (RPLMN) in memory) via 3GPP access to that PLMN. In addition, if the UE has not attached to a PLMN (i.e. the RPLMN has been deleted according to 3GPP TS 23.122, subclause 5), but has authenticated with a PLMN via wireless local area network (WLAN) there is no means for that PLMN to instruct the UE to select an ePDG in that VPLMN.

PLMNs are sometimes identified by a fully qualified domain name (FQDN) that is not constructed from a PLMN Identity (ID) as defined in 3GPP TS 23.002 (i.e. a Mobile Country Code (MCC) and a Mobile Network Code (MNC)). For example, a PLMN may purchase a service provider that was not a PLMN. As such, until such time as the PLMN can operationally upgrade the infrastructure, there will be a period of time when a PLMN is advertised using non-PLMN codes. Current mechanisms have been identified as being an acceptable way to enforce LI in some circumstances, however these mechanisms only allow PLMN IDs to be provisioned and, as such, if a PLMN has LI requirements but advertises itself via a FQDN, there is no way for the HPLMN to configure this PLMN in the current data set.

Also, a VPLMN may identify its ePDGs via FQDNs, and a UE may only select an ePDG in a VPLMN using PLMN ID/code or Tracking Area (TA)/Location Area (LA), yet the FQDN is associated with an ePDG. There is currently no means to provision the UE to select an ePDG using such an FQDN to allow the VPLMN to meet its LI obligations via existing mechanisms.

Finally, if a solution is deployed to resolve the above problems, there is a possibility a VPLMN might abuse the mechanism to mandate the UE to use an ePDG in the VPLMN when the VPLMN has no LI requirement in order to capture potential lost roaming revenue.

BRIEF SUMMARY

In one embodiment, a method for assisting a user equipment (UE) in selecting a network function is disclosed. The method comprises receiving a first message from the UE. The first message includes UE request capabilities. A second message is sent to the UE. The second message includes an indication that promotes the UE attempting to connect to a particular Public Land Mobile Network (PLMN) using a network function belonging to the particular PLMN.

In another embodiment, a network node for assisting a user equipment (UE) in selecting a network function is disclosed. The network node comprises a communication interface that receives a first message from the UE and sends a second message to the UE. The first message includes UE request capabilities. The second message includes an indication that promotes the UE attempting to connect to a particular Public Land Mobile Network (PLMN) using a network function belonging to the particular PLMN.

In yet another embodiment, a computer program product for assisting a user equipment (UE) in selecting a network function is disclosed. The computer program product comprises a storage medium readable by a processing circuit and storing instructions for execution by the processing circuit for receiving a first message from the UE, the first message including UE request capabilities, and sending a second message to the UE. The second message includes an indication that promotes the UE attempting to connect to a particular Public Land Mobile Network (PLMN) using a network function belonging to the particular PLMN.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

1. System Environment 1.1 Introduction

When a 3GPP device/UE accesses an Enhanced Packet Core/Evolved Packet System (EPC/EPS) core via an access network that is not a 3GPP defined access network (e.g., where a 3GPP access network could be a GSM EDGE (GERAN), Universal Terrestrial Radio Access Network (UTRAN) or Evolved UTRAN (E-UTRAN)), the UE needs to select and then establish a connection with an ePDG. The methods described herein may also be implemented using a software client (e.g., an "app") running on a 3GPP device/UE. A UE may comprise a mobile equipment (ME) and a Universal Integrated Circuit Card (UICC). Furthermore, an ME may be implemented as a combination of software blocks, wherein the functionality described herein could be a standalone block, or a combination of the operating system and underlying software stacks used to support wireless operations, with the RF apparatus being a separate function. In addition, a UE may also be referenced herein as a mobile device, or a mobile station (MA or STA). The terms UE and 3GPP device/user equipment are used predominately within the application, however the term ME can equally be interchanged with them. The following subsections describe different aspects and predicates for a UE to access an EPC via non-3GPP access.

1.2 Trusted Access

Trusted access may also be known as S2a access. The UE performs WLAN Access Authentication and Authorization (AAA). In this step, the UE receives a trust indicator from the network in the EAP signaling that is used as part of the Authentication and Authorization step. If the trust indicator indicates the network is trusted the UE uses trusted network access procedures as described in 3GPP TS 24.302.

1.3 Non-Trusted Access

Non-trusted access may also be known as S2b access. Once the UE has connected to a WLAN and Internet Protocol (IP) connectivity has been established on the connected-to WLAN (e.g., an IP address has been obtained, for example, using DHCP), then the UE sets up secure tunnel, (e.g., an Internet Protocol Security (IPsec) tunnel) to a network function or network element called an Evolved Packet Data Gateway (ePDG). The ePDG terminates (i.e. acts as an end point to) the IPsec tunnel and selects a Packet Data Network Gateway (P-GW) based on a parameter provided by the UE. ePDG selection is described in more detail in this document in section "1.5 ePDG selection."

In connecting to the WLAN and before establishing IP connectivity, the UE may perform WLAN Access Authentication and Authorization using EAP signaling (see section "1.4 EAP") or other means (e.g., splash screens or "capture portal," pre-shared key, username/password (which may use a AAA/RADIUS/Diameter server), etc.).

1.4 EAP

Figure 1:
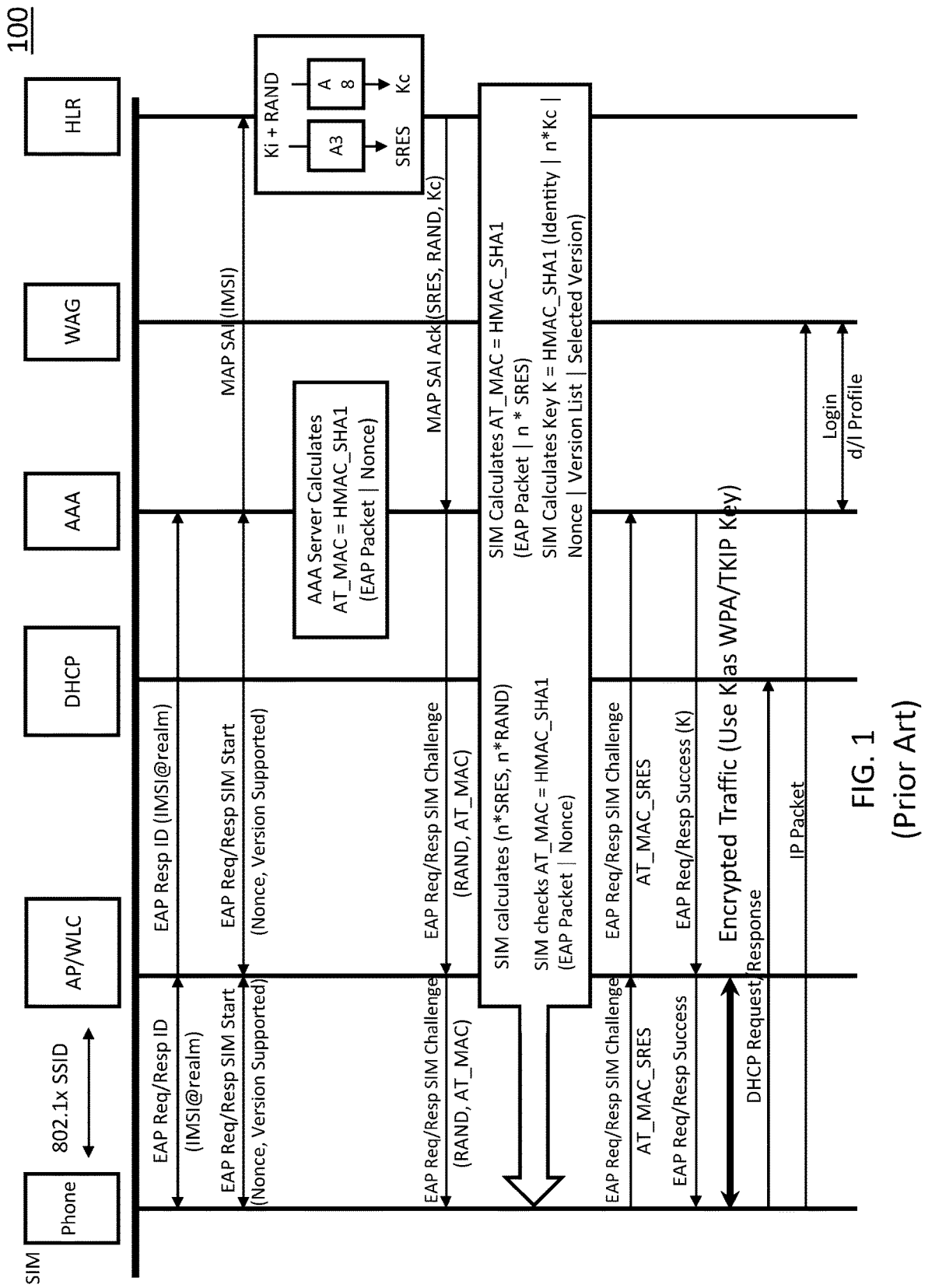
FIG. 1 is a diagrammatic view illustrating one example of how an Extensible Authentication Protocol (EAP) framework may be used in a cellular device in accordance with prior art.

The Extensible Authentication Protocol, as the name suggests, is an extensible authentication framework. EAP provides the necessary tools to incorporate other authentication schemes into the basic messaging structure. There are numerous different EAP mechanisms defined. A diagrammatic view 100 of how the EAP framework can be used in a cellular device can be seen in FIG. 1.

3GPP defines 3 EAP methods that can be used in a UE: EAP-AKA, EAP-SIM and EAP-AKA'. The EAP-SIM authentication mechanism has been generally considered by those expert in the subject area to have been compromised and therefore no longer safe to use, so only EAP-AKA and EAP-AKA' can be used to access an EPC/EPS core network.

Once EAP authentication has been successful, the UE can establish IP connectivity from the Wi-Fi network (e.g., using DHCP). Once IP connectivity has been established on the Wi-Fi network, an ePDG can be selected.

1.5 ePDG Selection 1.5.1 General

The ePDG that can be selected to be connected to by the UE can either be in the Visited PLMN (VPLMN) or the Home PLMN (HPLMN). The VPLMN is generally defined herein to indicate a PLMN whose Mobile Country Code (MCC), Mobile Network Code (MNC) does not match the MCC, MNC stored in either $EF_{IMSI}$ or $EF_{EHPLMN}$, both of which are specified in 3GPP TS 31.102. The HPLMN is generally defined herein to indicate a PLMN whose MCC, MNC does match the MCC, MNC stored in either $EF_{IMSI}$ as specified in 3GPP TS 31.102, or stored in $EF_{EHPLMN}$. Other potential HPLMNs can be Equivalent HPLMNs (EHPLMNs) and Equivalent PLMNs (EPLMNs). An EHPLMN is equivalent to a HPLMN and its identities are stored in $EF_{EHPLMN}$, specified in 3GPP TS 31.102. An EPLMN is equivalent to a Registered PLMN (i.e. the PLMN that the UE has successfully attached to), and its identities are received in an Attach Accept, Location Update Accept, Location Area Update Accept, Routing Area Update Accept and a Tracking Area Update Accept from the RPLMN.

The HPLMN has the ability to provision information within the UE to aid the UE in selecting the ePDG (e.g., via Open Mobile Alliance Device Management (OMA DM), via configuration on the Universal Subscriber Identity Module (USIM) (which could itself be provisioned there via OTA methods), etc).

1.5.2 Static Configured Address

The UE may be configured with static ePDG information. This information may consist of one or more IP addresses, a Fully Qualified Domain Name (FQDN) code, or a PLMN code. An FQDN is used as input into a Domain Name Service (DNS) query to retrieve one or more IP addresses.

1.5.3 Dynamic Address Creation

A more concise version of dynamic address creation functionality can be found in 3GPP TS 23.402 sub-section 4.5.4. or in C1-153983. If static ePDG information is not available to the UE, the HPLMN may provision ePDG selection information. ePDG selection information may consist of provisioning zero to many PLMN IDs, and against each PLMN ID is an indicator to indicate how the UE shall construct an FQDN (which in turn is resolved to one or more IP addresses, e.g. using DNS) and another indicator to be used in the event that the UE is unable to establish a connection to the ePDG in a VPLMN identified by the constructed FQDN (which was resolved to one or more IP addresses), that indicates if the HPLMN ePDG can be selected to establish a connection.

If the UE attaches to a PLMN (known as the RPLMN), and this RPLMN is not the HPLMN and is in the list of PLMN IDs, then the UE selects the ePDG in that RPLMN. If selection fails, depending on another parameter, the UE may try and select the ePDG in the HPLMN or PLMN selection may stop. The HPLMN can also provision a wild card entry in this list, whereby if the UE is roaming and the VPLMN ID is not in the PLMN list but the wild card entry is present in the PLMN list, then the UE will use the wild card entry to determine how to select the ePDG in the VPLMN. If ePDG selection in the VPLMN fails, depending on another indicator, the UE may select an ePDG in the HPLMN or may stop ePDG selection altogether.

1.6 Protocol Configuration Options (PCO)

Protocol Configuration Options (PCO) is a general name given to a capability that was first used in General Packet Radio System (GPRS). PCO allows a device, via a number of indicators (wherein an indicator can consist of one or more bits, or even the absence of one or more bits, in a message), to indicate to the network some information the UE requires. The network would respond back with information pertaining to the requested information and/or information not requested. The request and response mechanism was called PCO. This capability was later extended to UTRAN, Long Term Evolution (LTE) and E-UTRAN, and then also WLAN networks via Internet Key Exchange (IKE) signaling during ePDG connection establishment. Some data types that a UE can request and be provided with are described in 3GPP TS 24.008 subsection 10.5.6.3 (e.g., Proxy Call Server Control Function (P-CSCF) addresses, Network based IP Flow Mobility (NBIFOM) mode, IP Flow Mobility (IFOM) support, etc.).

PCO is defined in 3GPP TS 24.008 subclause 6.1.3.7, 3GPP 24.301 subclause 6.6.1 and 3GPP TS 24.302 subclause 6.9 and 6.4.3.5.2. In 3GPP accesses (e.g., GERAN, UTRAN, E-UTRAN) the PCO information comes from a Gateway GPRS Support Node (GGSN), or P-GW. The GGSN or P-GW can be located in the VPLMN or HPLMN. The GGSN or P-GW may be configured with the information (e.g., via operator operations and maintenance procedures) or obtain the information by some other means.

1.7 Voice Over Wi-Fi

When a UE makes a Voice over Wi-Fi (VoWiFi) call, the device first has to select an ePDG to access the EPC network that will connect to the IP Multimedia Subsystem (IMS) network. ePDG selection has been described above in section "1.5 ePDG selection." After ePDG selection has been performed, the UE creates a tunnel to the selected ePDG, and eventually performs an IMS/SIP REGISTRATION as described in 3GPP TS 24.229 with an IMS network that connects to the EPC network if the UE wants to use operator IMS services. After the IMS REGISTRATION has completed, the UE can make a voice call.

1.8 Lawful Intercept (LI)

When a UE is in a country there might be a need to perform Lawful Interception (LI) for calls that originated from that UE. LI is performed by intercepting the UE traffic in the network that the UE has attached to, the RPLMN or the network or PLMN that hosts the ePDG used in the same country. The access network and the core network are usually owned by the same entity or network or PLMN, or in the case of network sharing there is a business relationship between those two entities. Voice over LTE (VoLTE), entities and/or functions that may be used to intercept the traffic are the Mobility Management Entity (MME), the Serving Gateway (S-GW), the P-GW, the S-CSCF, the Media Gateway (MGW), etc. For circuit switched calls, the Mobile Switching Center (MSC) can be used to intercept traffic.

1.9 Dynamic Host Configuration Protocol (DHCP)

Figure 2:
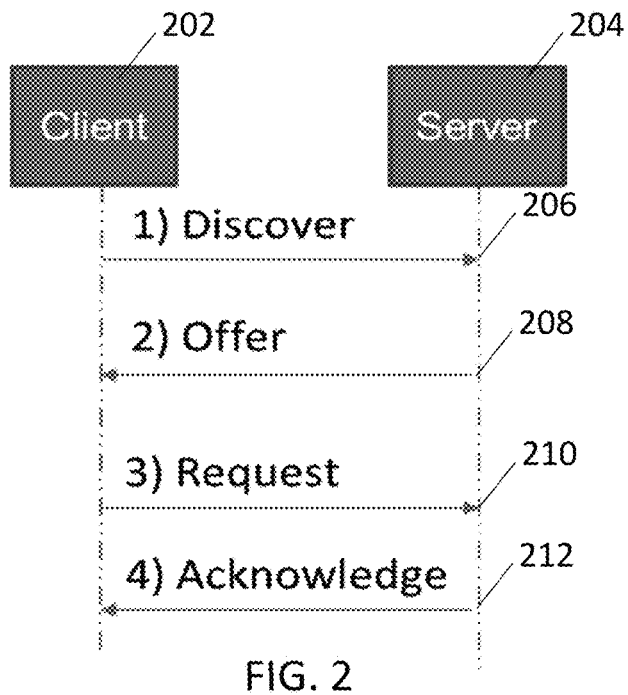
FIG. 2 illustrates one example of a message flow diagram for Dynamic Host Configuration Protocol (DHCP) in accordance with prior art.

DHCP is used in an IP network in order to dynamically configure network hosts with data/parameters (e.g., IP addresses, DNS servers, default gateway, etc.). The message flow for DHCP is shown in the flow diagram 200 of FIG. 2.

The DHCP client 202, which may reside/be hosted on a UE, broadcasts a Discover message 206 to the connected-to network (e.g., sends the Discover message to an IPv4 address of 255.255.255.255). One or more DHCP servers 204 (one shown) may respond to the client 202 with a DHCP Offer message 208, which contains one or more parameters (e.g., IP address).

In response to one of the DHCP Offers 208 the client 202 receives, the client 202 broadcasts a DHCP Request message 210 accepting the chosen DHCP Offer 208, and in this broadcast message there may be included some parameters requesting further configuration data/parameters.

In response to the received DHCP Request 210 that the DHCP Server 204 who sent the associated DHCP Offer 208 receives, the DHCP Server 204 sends a DHCP Acknowledgement 212 (also known as a DHCP ACK), which may contain such information as lease duration and any other configuration data/information that the client 202 may have requested. The DHCP client 202, upon receiving the DHCP Acknowledge 212, configures the host (e.g., the UE) appropriately with the received parameters for the interface upon which the DHCP transaction took place. Some basic DHCP options are defined by the Internet Engineering Task Force (IETF) in IETF RFC 2132, and further options are specified in further IETF specifications.

DHCP can be used in Internet Protocol version 4 (IPv4) networks and Internet Protocol version 6 (IPv6 networks), in which case DHCPv4 and DHCPv6 nomenclature is used. DHCPv6 has the following message names in place of those in FIG. 2 above: Solicit, Advertise, Request, and Reply.

1.10 WLAN ANQP (Access Network Query Protocol)

Generic Advertisement Service (GAS) is used as a transport mechanism for various advertisement protocols, including Access Network Query Protocol (ANQP). Each advertisement protocol connects the mobile device to one of several servers (e.g., the "Access Network Information" server) that can be located in the LAN to which an Access Point (AP) is connected or within the AP itself.

The advertisement protocol allows the bidirectional transmission of frames between a mobile device and a server in the network prior to network connectivity, so that the mobile device is effectively in a pre-associated state. Thus, a mobile device is connected to the layer 2 radio service, but has not exchanged any authentication parameters and does have a recognized session (e.g., no session keys are establishment and no IP address is assigned.) Therefore, according to the IEEE 802.11 standard, no user plane data traffic is allowed in this state and any signaling information is insecure and cannot be guaranteed. Any data/messages from the access point is considered as "hint" information by the mobile device, until authentication is complete, when this information can be verified if required.

As GAS operates between the mobile device and the AP being terminated in each entity, the AP is responsible for the relay of the mobile device's advertisement protocol to a server in the network and for delivering the server's response back to the mobile device.

Figure 3:
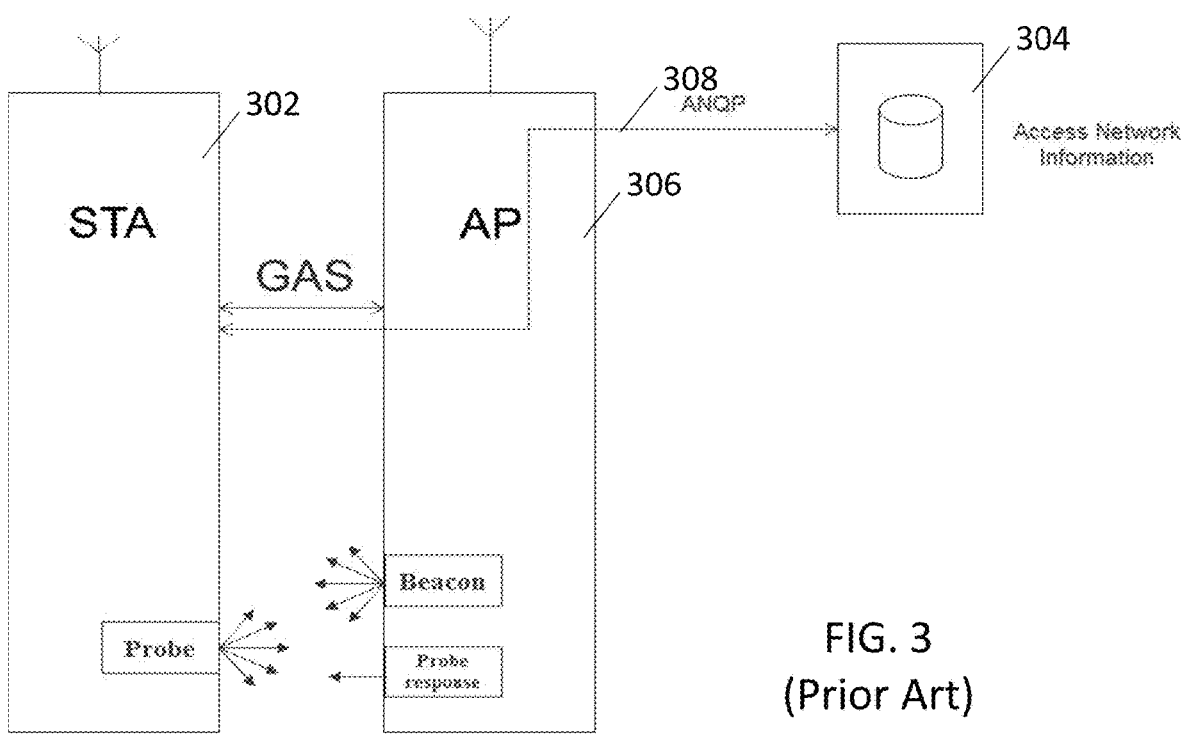
FIG. 3 is block diagram of a WLAN system using Access Network Query Protocol (ANQP) in accordance with prior art.

The IEEE 802.11 Access Network Query Protocol (ANQP) is one example of an advertisement protocol transported between mobile stations (STAs) and access points (APs). The STA is the equivalent of a UE. The architecture of the WLAN system 300 is shown in FIG. 3. ANQP operates as a simple query and response protocol that is used by a mobile device 302 to discover a range of information from an Access Network (AN) server 304. This AN server 304 is either co-located with an Access Point (AP) 306 or is located within the Local Area Network (LAN), which is the layer 2 network to which the AP 306 is connected.

ANQP allows a mobile device 302 (e.g., STA, UE, MS) to determine the properties of the LAN before starting or at any time after starting the association procedure. Information obtained through ANQP can include: network identifiers, roaming relationships, supported security methods (e.g., IEEE 802.1X and web-based authentication), emergency services capability, available service providers, etc. This ability enables ANQP to be a very powerful protocol capable of discovering information about WLANs, prior to the mobile device 302 establishing network connectivity.

Currently there are about 23 individual ANQP-elements that have been defined in IEEE 802.11 and the Wi-Fi Alliance Hotspot 2.0 program, each one capable of retrieving different information from the LAN, for example: AP Location, AP Venue Name, Service Provider availability, etc.

To discover each ANQP element, the UE (STA) 302 sends an ANQP Request 308 to the AP 306 with an integer identifier (Info ID) corresponding to the desired information report. The AP 306 then responds with an information element containing that information report. For example, the UE 302 sends the integer 265 in an ANQP Request 308 to the AP 306 to obtain the location (latitude and longitude) information of that AP 306 in an ANQP Response message.

1.11 Cell Broadcast

Figure 4:
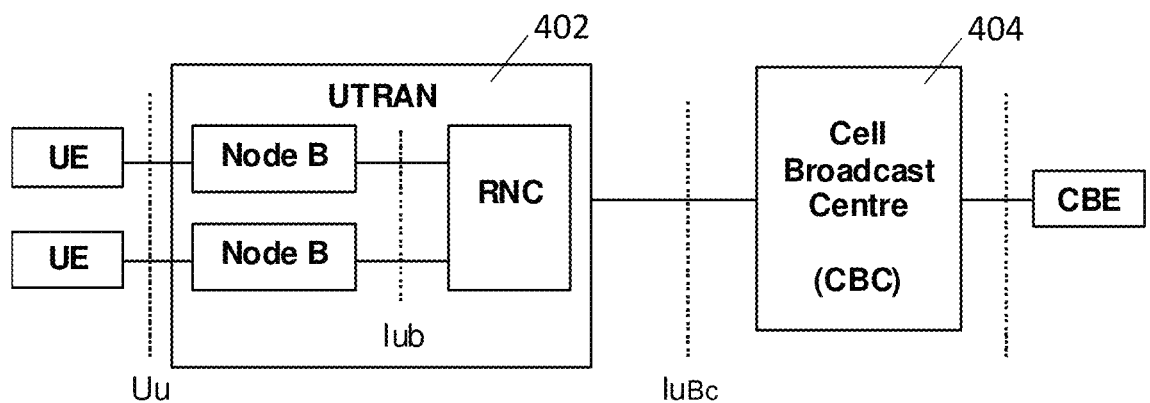
FIG. 4 is a block diagram of an example architecture for cell broadcast service.
Figure 5:
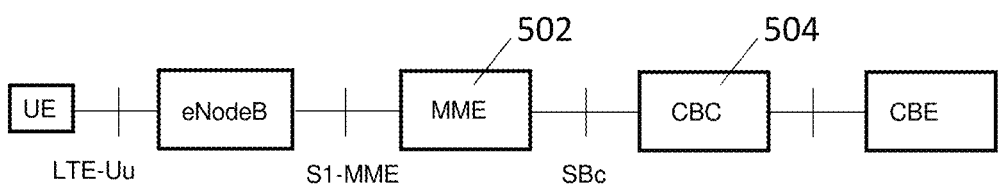
FIG. 5 is another block diagram of an example architecture for cell broadcast service.

Cell Broadcast is a broadcast technology that was developed for GSM and has been adapted to both UTRAN and E-UTRAN systems. Cell Broadcast allows a device to listen to a known logical control channel on the radio interface and receive messages. Broadcast messages can be marked for specific services and or broadcast in specific regions and can be cyclic in nature, meaning they are repeated. FIGS. 4 and 5 show two architectures 400, 500 out of three for Cell Broadcast service (CBS). The key differences are that in FIG. 4, the Radio Access Network 402 connects to the Cell Broadcast Centre (CBC) 404, where in FIG. 5 the core network, MME 502, connects to the CBC 504.

CBS provides a framework for messages to be either displayed to the user (via MessageID 4370) or consumed by an application within the device (via MessageID 0-4351).

1.12 MBMS

Multimedia Broadcast/Multicast Service (MBMS) is a 3GPP broadcast technology that is similar to CBS, but MBMS allows an operator to deliver more data intensive content to a group of users (e.g., TV, video, etc.). MBMS is supported by GERAN, UTRAN and E-UTRAN. MBMS over E-UTRAN is referred to as eMBMS and is described in 3GPP TS 36.300.

MBMS supports two basic transmission modes for delivering IP packets: broadcast and multicast. The MBMS Broadcast mode can be used to deliver IP packets to all terminals in a certain area or the whole network. If the MBMS broadcast mode is used, a transmission bearer is setup for all cells in which the service should be available and is continuously transmitting as long as the service is up and running. In broadcast mode, MBMS does not require an uplink connection and can thus be used like any other "downlink-only" broadcast technology (e.g., Digital Video Broadcasting-Handheld (DVB-H), Digital Video Broadcasting-Terrestrial (DVB-T), Digital Multimedia Broadcasting (DMB), etc.).

The MBMS Multicast mode works very similar to IP multicasting. A terminal which wants to receive information related to a particular multicast channel "joins" one or several content channels (e.g., expresses interest to receive content associated with this channel). This information is processed in the routing layer of the core network and is used for optimizing the data delivery path. "Optimizing" means that data is transmitted just once over connections shared by receivers of the same multicast channels. The only drawback of multicasting is the additional delay when switching from one channel to another one. Therefore, MBMS multicasting is less suitable for mobile TV services which usually require a low TV channel switching delay. The main application of MBMS multicasting is for download services or music casting services.

MBMS was specified such that broadcast/multicast services can be used together with voice and data services within the same radio carrier. This arrangement gives the greatest flexibility to cellular operators.

1.13 Network Selection

Network Selection for a UE is defined in 3GPP TS 23.122. A UE can be registered in a network or not registered in a network. When a UE successfully registers in a network, the UE stores the registered network, known as RPLMN within memory. The RPLMN is the PLMN ID (Mobile Country Code, Mobile Network Code) received in the Attach Accept from the network. This RPLMN is stored in memory even if the UE is out of radio coverage. The RPLMN is deleted from memory under specific conditions. These conditions are shown in Table 1 of the Appendix attached, which quotes 3GPP TS 23.122.

2. Embodiments

A number of solutions for network selection (e.g., cellular network selection) for a 3GPP device/user equipment to access an EPC via an access network that is not a 3GPP defined access network are presented in this section. Solutions generally include one or more means/methods of receiving an access node (e.g., ePDG) selection indicator as well as one or more means/methods of using the access node (e.g., ePDG) selection indicator. One will appreciate that the solutions below can be mixed and matched to create further embodiments. Also, some of the solutions identify that a UE might support or be requesting VoWLAN. These solutions may equally be used for requesting ePDG support or requesting ePDG support. Those skilled in the art will appreciate that an ePDG is a node that provides access to the core network and the ePDG could be considered an "access node". For the purposes of the description below the term "access node" could be equally used for ePDG.

2.1 3GPP Request/Response Mechanisms Attach, LAU, RAU, TAU

Solutions for instructing an UE to select an ePDG in the VPLMN by the VPLMN when the UE has attached to a PLMN (i.e. the UE has an RPLMN in memory) via 3GPP access to that PLMN are discussed in this subsection.

Figure 6:
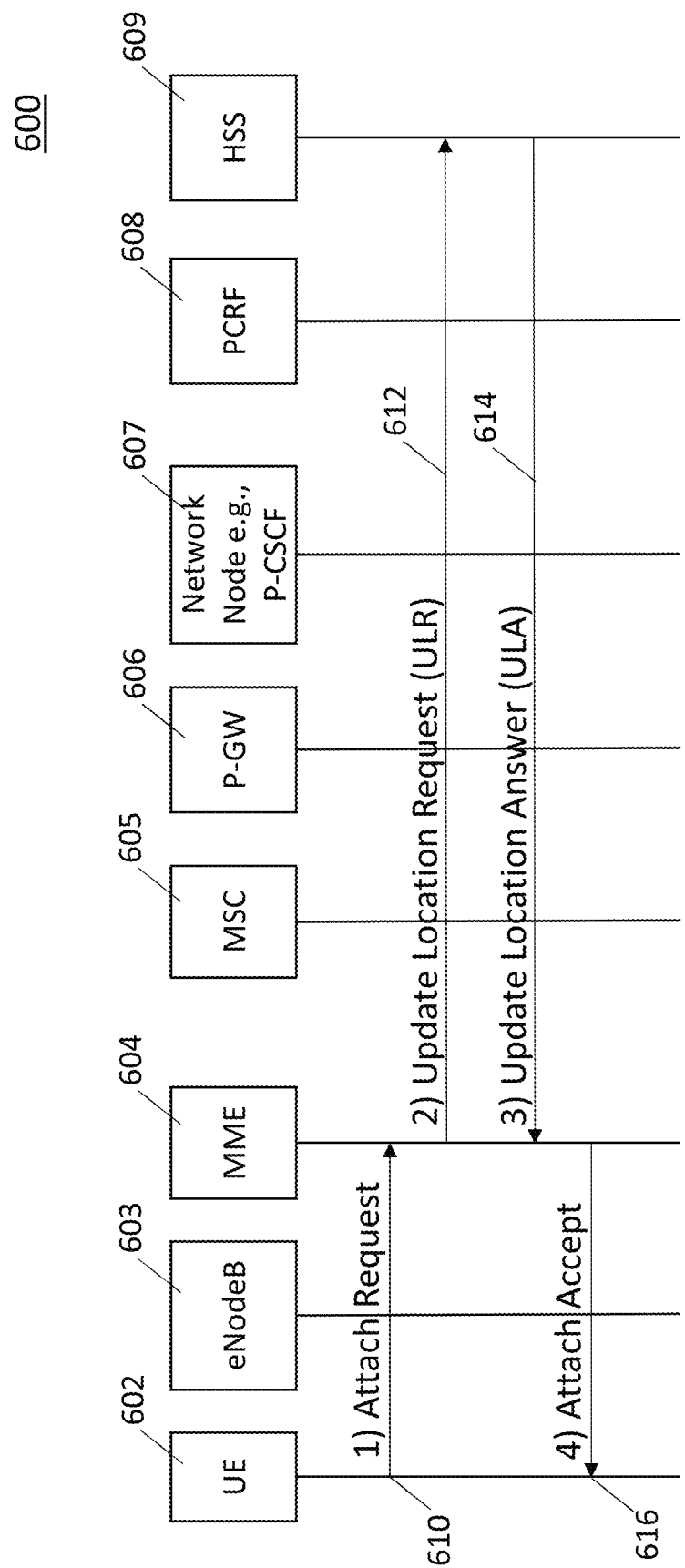
FIG. 6 is an operational flow diagram illustrating one example of a method of receiving an ePDG selection indicator via Location Area Update (LAU) Accept, Routing Area Update (RAU) Accept, Tracking Area Update (TAU) Accept or Attach Accept, in accordance with one embodiment of the present disclosure.

2.1.1 Receipt of ePDG Selection Indicator Via Location Area Update (LAU) Accept, Routing Area Update (RAU) Accept, Tracking Area Update (TAU) Accept, Attach Accept FIG. 6 is an operational flow diagram 600 illustrating an example process for selecting a network node by way of receiving an ePDG selection indicator via at least one of but not limited to LAU Accept, RAU Accept, TAU Accept or Attach Accept, etc. The UE 602 may perform the procedure below when first attaching to the network or the UE 602 may request an ePDG selection indicator when there is an indication that Wi-Fi connectivity has either been requested or Wi-Fi connectivity has been obtained or achieved. This indication could be, for example, that the UE 602 has an IP address from the WLAN or the UE 602 has an IP address and has determined that internet is available (e.g., the UE 602 has pinged and a result has been returned from a known URL).

The ePDG selection indicator could be one of the following:
1. A single bit to indicate that ePDG selection is required in the VPLMN or that ePDG selection is not required in the VPLMN. In other words, VoWLAN is supported, or VoWLAN is not supported.
2. An information element containing the FQDN of the ePDG to use for ePDG selection.
3. An information element containing an IP address of the ePDG to use for ePDG selection.

It should be noted that options 2 and 3 perform the same function as option 1; however, the support of ePDG selection in the PLMN or the lack of support of ePDG selection in the PLMN is conveyed by the presence of the FQDN/IP address or the absence of the FQDN/IP address.

It should also be noted that FIG. 6 includes system components of an LTE system for completeness purposes (e.g., eNodeB 603, MME 604, MSC 605, P-GW 606, network node 607, Policy & Charging Rule Function (PCRF) 608, and Home Subscriber Server (HSS) 609); however, each component shown may or may not have an active role in the procedures described herein.

The UE 602 begins the process by sending, at step 610, a first message (Message #1) to a first network node (Network Node #1) MME 604. Message #1 contains a private user identity and, optionally, "UE request capabilities." In the example shown in FIG. 6, Message #1 is an Attach Request; however, Message #1 620 could also be a LAU, a RAU, a TAU, or an ANQP Query. In addition, Network Node #1 is shown as MME 604; however, Network Node #1 could also be MSC 604, a Serving GPRS Support Node (not shown), an AAA (not shown), a DNS server (not shown), an ANQP server (not shown), an DHCP server (not shown), etc.

Examples of a private user identity include an IMSI, a Temporary Mobile Subscriber Identity (TMSI), a Packet Temporary Mobile Subscriber Identity (P-TMSI), a Global Unique Temporary ID (GUTI), a Network Access Identifier (NAI), Globally Unique Temporary ID (GUTI), etc.

"UE request capabilities" defines a single or group of indicators indicating: a) ePDG selection and/or b) VoWiFi (i.e. VoWLAN). The VoWiFi could be a set of indicators that could be set, for example, in an existing field, giving voice domain preference to either: a) IMS over WLAN voice only, b) IMS over LTE preferred, c) IMS over WLAN secondary, or d) IMS over LTE secondary, IMS over WLAN preferred.

Network Node #1 604 receives Message #1, optionally containing the "UE request capabilities," and determines if the UE 602 should select an ePDG in a specific PLMN (such as a current PLMN, a PLMN in which the MME is located, the PLMN named in the Attach Request, a VPLMN, P-GW 606, etc.) in the event the UE attempts to use or uses untrusted WLAN access (e.g., with S2b, the UE wishes to establish an Internet Key Exchange (IKE or IKEv2) security association and the UE does not use dual stack mobile IPV6 when attempting to establish the IKEv2 security association, when the UE attaches to the EPC via WLAN IP access). This determination may be performed by examining the international mobile subscriber identity (IMSI) and/or receipt of ePDG data from a third network node (Network Node #3) (e.g., HSS 609). In the case shown in FIG. 6, Network Node #1 (MME 604) sends, at step 612, an Update Location Request (ULR) (i.e. Message #2) to Network Node #3 (HSS 609). The Network Node #3 (HSS 609) responds, at step 614, by sending an Update Location Answer (ULA) (i.e. Message #3) back to Network Node #1 (MME 604). The ULA includes an information element containing an indication that the received IMSI from the Network Node #3 (HSS 609) also has ePDG/VoWLAN capabilities.

Network Node #1 (MME 604) sends, at step 616, Message #4 back to the UE 602. In the case of FIG. 6, Message #4 is an Attach Accept; however, Message #4 may also be a LAU Accept, an RAU Accept, a TAU Accept or an ANQP Response. Message #4 contains a ePDG selection indicator if the UE 602 should select the ePDG in the VPLMN, or does not contain the ePDG selection indicator if the UE 602 should select the ePDG in the VPLMN.

UE 602 receives Message #4 containing the ePDG selection indicator indicating whether ePDG selection should be performed and, optionally, a location identifier (e.g., a Location Area/Routing area/tracking area identity).

As mentioned previously, the above procedure is described for when a UE 602 attaches to the network. However, the above procedure may also be performed after a normal Attach, thus when there is an indication that the UE's Wi-Fi radio has been turned on or Wi-Fi connectivity has been achieved (i.e. an IP address has been assigned to the UE from a Wi-Fi network) the UE 602 will perform a Location Area Update/Tracking Area Update/Routing Area update and perform the above procedure. The above procedure may be implemented using the following proposed changes to 3GPP TS 24.301 shown in Table 2. Proposed additions in all Tables include herein are indicated by underlined text. Proposed deletions are indicated by strikethrough text.

Table 3 shows proposed changes to 3GPP TS 24.008 detailing one possible embodiment of how the UE request capabilities may be encoded. In this example, the UE request capabilities are conveyed as a set of indicators. The UE request capabilities could equally be conveyed as a single flag/bit, so using the example below, a spare bit in octet 3 could be used or another information element or information element in a response message (e.g., Attach Accept LAU accept, RAU accept, etc.).

2.1.2 Receipt of ePDG Selection Via PCO

Figure 7:
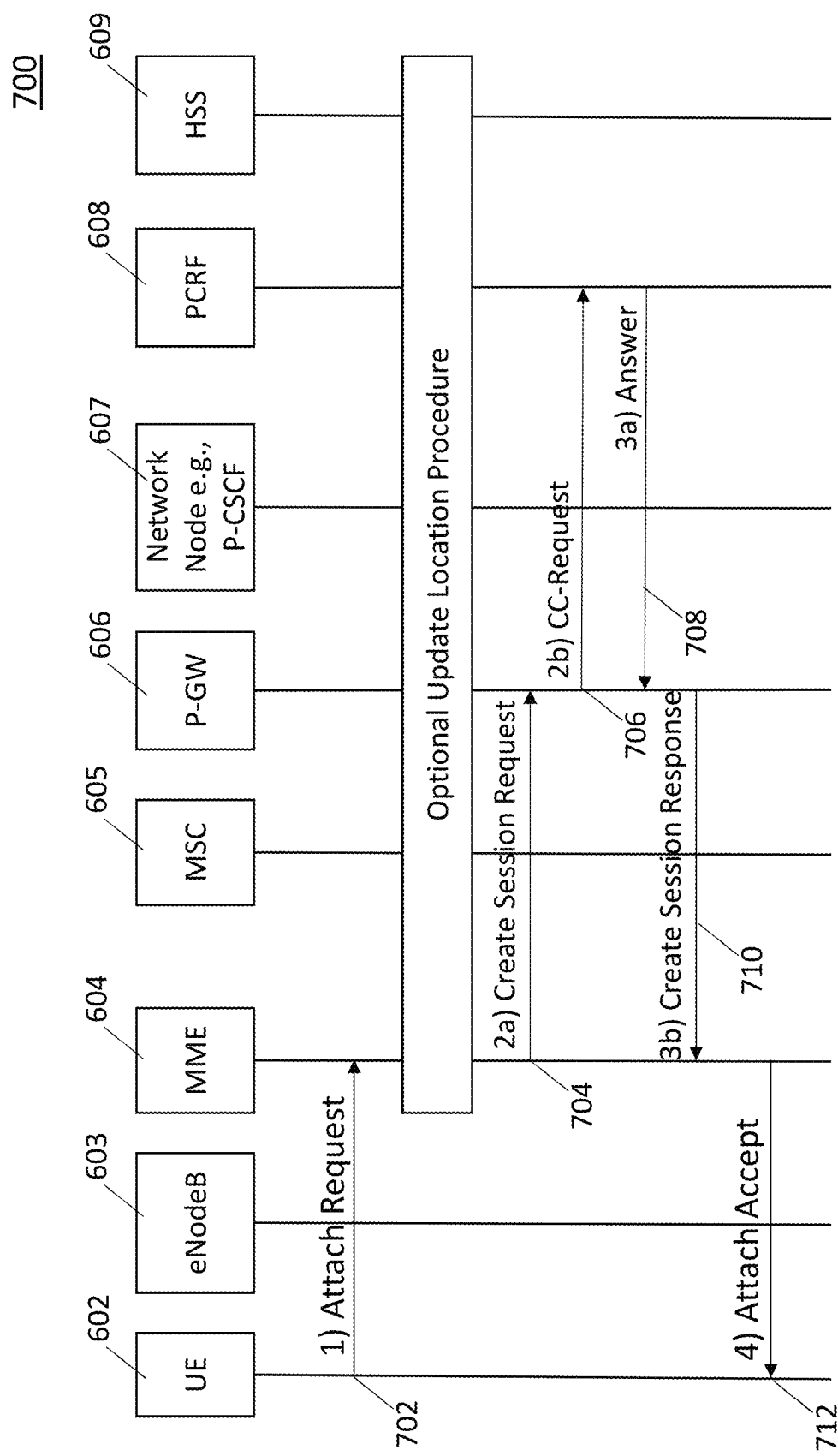
FIG. 7 is an operational flow diagram illustrating one example of a method of receiving an ePDG selection indicator via Protocol Configuration Options (PCO), in accordance with one example of the present disclosure.

FIG. 7 is an operational flow diagram 700 illustrating an example process for selecting a network node by way of receiving an ePDG selection indicator via Protocol Configuration Options (PCO). Note that the system components are the same or similar to components previously shown in FIG.

6 for purposes of completeness (i.e. UE 602, eNodeB 603, MME 604, MSC 605, P-GW 606, network node 607, PCRF 608, and HSS 609); however, each component shown may or may not have an active role in the procedures described herein.

The UE 602 begins the process by sending, at step 702, Message #1 to a first network node (Network Node #1) illustrated in FIG. 7 as MME 604. Although Network Node #1 is shown in FIG. 7 as MME 604, Network Node #1 may also be an MSC an SGSN, an AAA, a DNS Server, a DHCP Server, and the like. Message #1 contains a private user identity and, optionally the "UE request capabilities."

Network Node #1 receives Message #1 and if the private user identity has no associated subscriber profile at Network Node #1, sends, at step 704, Message #2a to a second network node (Network Node #2) illustrated in FIG. 7 as P-GW 606. Network Node #2 may be a GGSN. Message #2a could be a message used to create the Packet Data Protocol (PDP) context for VoLTE (i.e. Message #2a may contain the "well known IP Multimedia Subsystem Access Point Name (IMS APN)"). Message #2a contains the private user identity and if received Message #1 contained the "UE request capabilities," Message #2a will also contain these UE request capabilities.

Network Node #2 receives Message #2a containing the optional "UE request capabilities." Based either on the "UE request capabilities," if present, and/or the APN that is being used, Network Node #2 obtains the policy for the connection (e.g., by consulting with an external database that could be the PCRF 608).

Network Node #2 sends, at step 706, Message #2b to a third network node (Network Node #3) shown in FIG. 7 as P-GW 606. Message #2b may include an optional indication that VoWLAN is supported. In other words, the indication means that the IMSI is authorized to make VoWLAN calls. It should be noted that this indicator could equally be called "non-3GPP access allowed." Network Node #3 receives Message #2b and, based upon the content, at step 708, sends Message #3a containing the policy to be used for ePDG selection/VoWLAN. Message #3a contains an ePDG selection indicator as described above.

Network Node #2 receives Message #3a containing the ePDG selection indicator and Network Node #2 sends, at step 710, Message #3b containing Message #3a ePDG selection indicator. Network Node #2 sends, at step 712, the received ePDG selection indicator to the UE in Message #4. Finally, UE 602 receives Message #4 containing the ePDG selection indicator.

The above procedure may be implemented using the following proposed changes to 3GPP TS 24.008 shown in Table 4. Proposed changes are indicated by underlined text. MS to network direction information is present in Message #1 and Message #2a. Network to MS direction information is present in Message #3b and Message #4.

Table 5 represents an embodiment of Message #2b and Message #3a by implementing proposed changes to 3GPP TS 29.212.

Table 6 presents proposed changes to 3GPP TS 23.401.

2.1.3 Use of ePDG Selection Indicator

The indication received from the network may be stored in UE memory against the PLMN ID (i.e. RPLMN) that provided the indication (e.g., the PLMN ID can be derived from Tracking/Routing/Location area identity received in an Accept message. The indication shall be deleted from UE memory if the RPLMN is deleted/marked as not valid per 3GPP TS 23.122 subclause 5 (i.e. there is no registered PLMN).

If the UE has stored an ePDG selection indicator in memory and that ePDG selection indicator indicates to select an ePDG in RPLMN the UE ignores any information provisioned as described in section "1.5 ePDG selection" according to known methods.

If a single bit was received to indicate that ePDG selection is required in the VPLMN or ePDG selection is not required in the VPLMN (i.e. VoWLAN is supported, or VoWLAN is not supported), then if the RPLMN is the HPLMN and the UE has the ePDG identifier provisioned in the ePDG configuration information, then the UE uses the ePDG configuration information. If a single bit was received and the RPLMN is in the ePDG configuration information as specified in 3GPP TS 23.402, then the UE constructs an FQDN using the RPLMN ID stored in memory and the policy stored against that RPLMN ID as per 3GPP TS 23.402. Finally, if a single bit was received and the RPLMN is not in the ePDG configuration information as specified in 3GPP TS 23.402, but an equivalent PLMN as received in the Attach Accept is in the ePDG configuration information as specified in 3GPP TS 23.402, then the UE constructs an FQDN using the last registered PLMN ID stored in memory or equivalent PLMN ID.

However, if an FQDN was received, the UE uses that FQDN in contacting the ePDG. The FQDN shall be used as input to DNS query to obtain IP address of the ePDG. If an IP address was received, the UE shall use the IP address to contact the ePDG. The UE uses the IP address to set-up an IPSec tunnel to the ePDG.

If selection of the ePDG fails in the VPLMN the UE will then use static ePDG information to contact the ePDG; or construct an FQDN using the MCC, MNC of the IMSI stored in the $EF_{IMSI}$ file on the USIM.

Table 7 presents one example of proposed changes to 3GPP TS 23.402 for use of the ePDG selection indicator.

Table 8 presents a second example of proposed changes to 3GPP TS 23.402.

Table 1 makes reference to Updated state in 3GPP TS 23.122. This text could be replaced with the other states and specifications as described in Table 9.

In addition, Table 10, below, makes reference to "Non-access stratum layer as defined in 3GPP TS 24.301," which can be replaced or "Or'd" with "Non-access stratum layer as defined in 3GPP TS 24.008" or removed from the text.

Table 11 represents the second example, proposing alternate changes to 3GPP TS 24.302 based on other aspects.

2.2 Broadcast Information

Another example provides a different method which uses broadcast information for instructing an UE to select an ePDG in the VPLMN by the VPLMN when the UE has attached to a PLMN (i.e. the UE has an RPLMN in memory) via 3GPP access to that PLMN in this subsection.

2.2.1 Receipt of ePDG Selection Indicator

Network broadcasts system information. System information contains ePDG selection indicator. Other implementations the ePDG information may be broadcast using Cell Broadcast/CBS or MBMS.

The UE receives Broadcast Information/CBS/MBMS that contains the ePDG selection indicator. The UE stores the ePDG selection indicator against the PLMN ID code received in the broadcast information that contained the ePDG selection indicator or in corresponding system information that was broadcast.

The UE may be in CONNECTED, IDLE or Limited-Service State when it receives the Broadcast information. If the UE is turned off the ePDG selection indicator is deleted. As an option, receipt of ePDG selection indicator in broadcast system information might result in the UE also performing one of the methods of section 2.1 to obtain the ePDG selection indicator. For example, the broadcast ePDG selection indicator may be a flag to indicate ePDG address is available. The UE would perform a method of section 2.1 to obtain the specific ePDG address.

2.2.2 Use of ePDG Selection Indicator

Use of the ePDG selection indicator operates in the same manner as described above in section 2.1.3.

2.3 WLAN ANQP

A WLAN ANQP may be used to enable a PLMN to instruct the UE to select an ePDG in a VPLMN if the UE has not attached to a PLMN (i.e. the RPLMN has been deleted according to 3GPP TS 23.122 subclause 5), but has authenticated with a PLMN via WLAN.

2.3.1 Receipt of ePDG Selection Indicator

Figure 8:
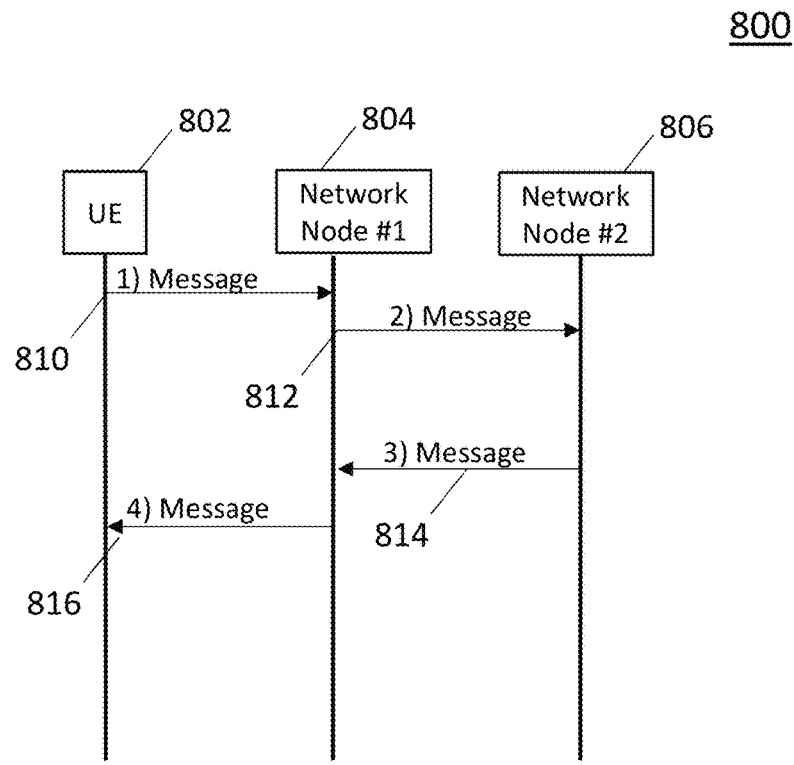
FIG. 8 is an operational flow diagram illustrating one example procedure for a UE to receive an ePDG selection indicator using WLAN ANQP, in accordance with one example of the present disclosure.

FIG. 8 illustrates an operational flow diagram 800 showing a procedure for a UE to receive an ePDG selection indicator using WLAN ANQP in accordance to one example of the present disclosure. The UE 802 sends, at step 810, message #1 to Network Node #1 804. Network Node #1 804 may be an Access Point and message #1 may be an ANQP request. Network Node #1 804 receives the message #1. Message #1 may contain Additional UE Provided Information.

Upon receiving Message #1, Network Node #1 804 may send, at step 812, Message #2 to Network Node #2 806. Message #2 may be, for example, a CC-Request. Message #2 may contain Additional UE Provided Information if received in Message #1. Network Node #2 806 may be an advertisement server for ANQP. It should be noted that the functionality of Network Node #2 806 may be co-located with Network Node #1 804, so that Message #2 and Message #3 become internal messages within Network Node #1 804. Upon receiving Message #2, Network Node #2 806 sends, at step 814, Message #3 to Network Node #1 804. Message #3 may be a CC-Answer and may contain one or both of Routing Data and/or an error message. Upon receiving Message #3, Network Node #1 804 sends, at step 816, Message #4 to UE 802. Message #4 may be, for example, an ANQP Response containing one or both of Routing Data and/or an error message depending on what was received in Message #3.

The underlined text in Table 12 represents changes to the Wi-Fi Alliance Hotspot 2.0 (Release 2) Technical Specification Version 1.0.1.

2.3.2 Use of ePDG Selection Indicator

Use of the ePDG selection indicator operates in the same manner as described above in section 2.1.3.

2.4 EAP Procedure

EAP may also be used to enable a PLMN to instruct the UE to select an ePDG in a VPLMN if the UE has not attached to a PLMN (i.e. the RPLMN has been deleted according to 3GPP TS 23.122 subclause 5), but has authenticated with a PLMN via WLAN.

2.4.1 Receipt of ePDG Selection Indicator

Figure 9:
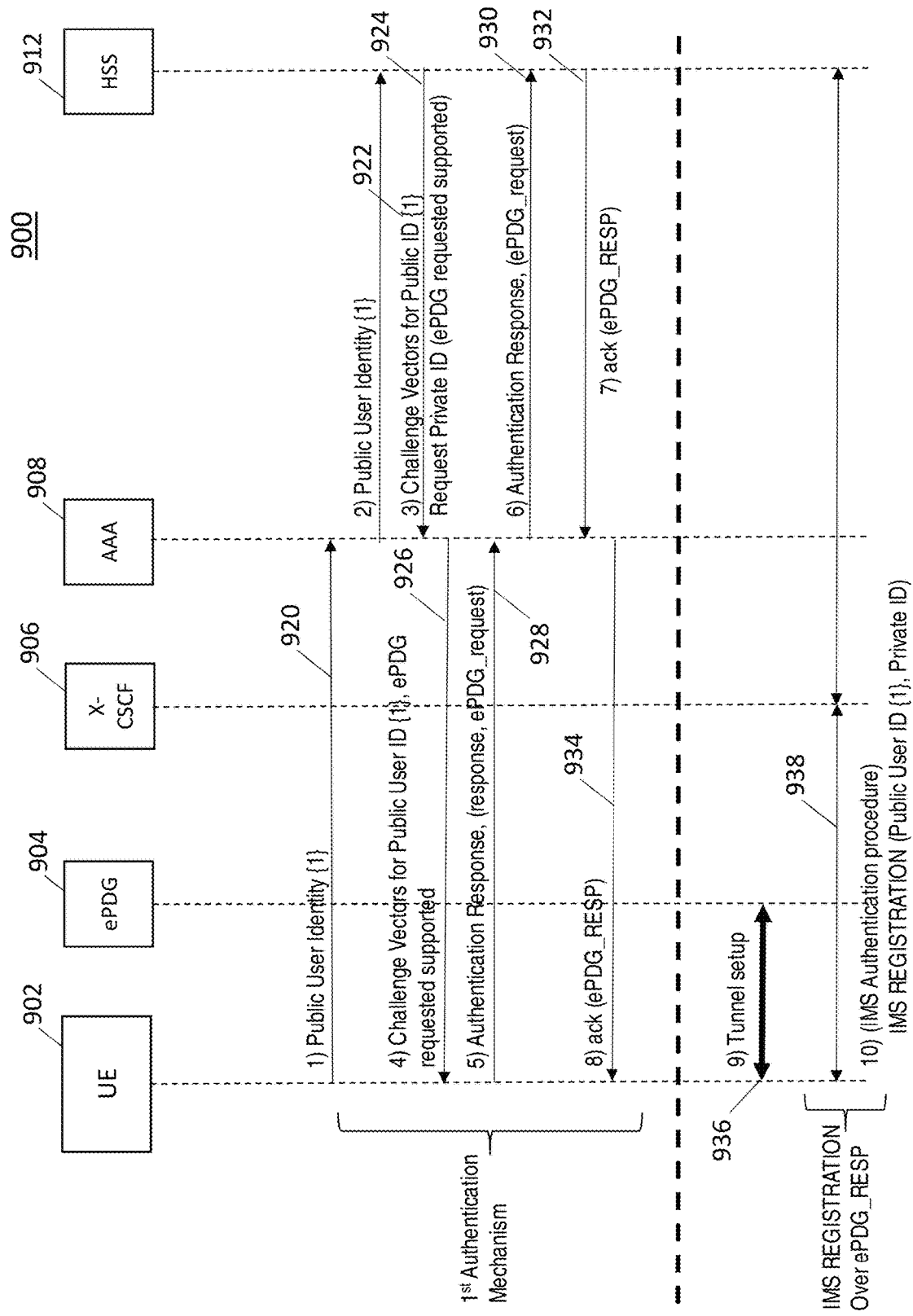
FIG. 9 is an operational flow diagram illustrating one example procedure for a UE to receive an ePDG selection indicator using EAP, in accordance with one example of the present disclosure.

FIG. 9 illustrates an operational flow diagram 900 showing a procedure for a UE to receive an ePDG selection indicator using EAP in accordance with one example of the present disclosure. It should also be noted that FIG. 9 includes system components of a network for completeness purposes (e.g., UE 902; ePDG 904; X-CSCF 906; Authentication, Authorization and Accounting (AAA) server 908 and HSS 912); however, each component shown may or may not have an active role in the procedures described herein. It should be noted that X-CSCF 906 could be a P-CSCF, an S-CSCF, or an I-CSCF).

The UE 902 sends, at step 920, an authentication message to the AAA server 908 containing one to many identities, including a Public User Identity. AAA server 908 receives the authentication message from the UE 902 containing one to many identities and determines if the UE 902 should select an ePDG in that PLMN. This determination may optionally be performed by sending, at step 922, a message containing the Public User Identity (i.e. Message #2) to an external database, such as HSS 912, and HSS 912 responds, at step 924, by sending a message (i.e. Message #3) containing challenge vectors for the Public User Identity contained in Message #2 and a Request Private ID indicating whether the requested ePDG selection indicator is supported, back to AAA server 908.

The AAA server 908 sends, at step 926, an authentication message (i.e. Message #4) to the UE 902 containing a parameter "ePDG selection indicator supported." This parameter indicates that the AAA server 908 can send "ePDG selection indicator" in a later authentication message. The UE 902 sends, at step 928, an authentication response message (i.e. Message #5) to the AAA server 908 containing an indication (e.g., "ePDG_request") that ePDG address is required. The AAA server 908 receives, from the UE 902, the authentication message containing an ePDG selection indicator indicating that an ePDG address is required (i.e. Message #5). The AAA server 908 may optionally request the ePDG address from an external database, such as HSS 912, by sending, at step 930, an authentication message (i.e. Message #6) containing the ePDG selection indicator to the external database. In this case, the AAA server 908 receives, at step 932, the ePDG address in an ePDG selection indicator from the external database as an acknowledgement message (e.g., as an ePDG_RESP). The AAA server 908 sends, at step 934, an authentication message to the UE 902 containing the ePDG selection indicator with ePDG address. At step 936, the UE 902 uses the ePDG address received in step 934 to setup a secure tunnel to the ePDG. This may consist of sending an ePDG FQDN to a DNS server so that the FQDN can be resolved into an IP address of the ePDG. At step 938, the UE 902 performs a standard IMS REGISTRATION with the P-SCSF/S-CSCF 906.

Table 13 presents proposed changes to 3GPP TS 24.302 for implementing this example method.

2.4.2 Use of ePDG Selection Indicator

Use of the ePDG selection indicator operates in the same manner as described above in section 2.1.3.

2.5 ePDG Selection Enhancement

Another example method works in conjunction with the above methods to prevent the possibility that a VPLMN might abuse the mechanism to mandate the UE to use an ePDG in the VPLMN when the VPLMN has no LI requirement to capture potential lost roaming revenue.

In this example, the UE now has an LI policy stored in either the USIM, or the Home Access Network Discovery and Selection Function (H-ANDSF). The LI policy includes a list of entries, 0 to many, that contains an identity and an action that should be performed if that identity matches. The identity may be a PLMN ID, an MCC, an FQDN, an NAI, an IP address or a wildcard. The action may be mandatory or optional. If an entry in the LI policy contains the action "mandatory," the UE shall use the ePDG selection indicator provided by the RPLMN. If an entry in the LI policy contains the action "optional," the UE shall not use the ePDG selection indicator provided by the RPLMN.

2.5.1 Receipt of the ePDG Selection Indicator

Any of the methods described herein may be used in conjunction with the method of section 2.5.2 to receive the ePDG selection indicator.

2.5.2 Use of ePDG Selection Indicator

The actions of the UE are dependent upon the attachment of the UE. If the UE has attached to a PLMN via 3GPP or has not attached to a PLMN via 3GPP access and has authenticated with a PLMN via WLAN access and that PLMN is contained within the LI policy, the actions are further dependent upon the LI policy. If the PLMN has a policy of "mandatory," then the UE shall follow the procedures as described above in section 2.1.3. If the PLMN has a policy of "optional," then the UE shall follow the procedures as described in 3GPP TS 23.402 sub-section 4.5.4.

If the UE was not attached to a PLMN and when setting up a connection to an ePDG will use an FQDN, IP address or NAI that has an entry in the LI policy. If that entry in the LI policy has an action of "mandatory," then the UE shall follow the procedures as described in section 2.13. If that entry has an action of "optional," then the UE shall follow the procedures as described in 3GPP TS 23.402 sub-section 4.5.4.

Table 14 shows proposed changes to 3GPP TS 23.402 to implement this method. The bold text represents the difference between that described in section 2.1.3 and the proposed changes.

Table 15 shows proposed changes to 3GPP TS 24.312 illustrating how the LI policy may be stored in the UE. The LI policy could equally be stored in an application on the UICC (e.g., USIM) using the data model shown in FIG. 10.

2.6 DHCP

In one example method, DHCP is used to instruct the UE to select an ePDG in the VPLMN by the VPLMN when the UE has attached (has an RPLMN in memory) via 3GPP access to that PLMN (e.g., when the connected-to WLAN is carrier-owned). In addition, if the UE has not attached to a PLMN (i.e. the RPLMN has been deleted according to 3GPP TS 23.122 subclause 5), but has authenticated with a PLMN via WLAN, DHCP is used to instruct the UE to select an ePDG in that VPLMN.

2.6.1 UE Procedures

DHCP is enhanced so that an "ePDG selection indicator" can be returned to the UE when the UE performs DHCP negotiation after attaching to the WLAN and attempting to negotiate with a DHCP server to gain certain information (e.g., IP layer information such as IP address to use, DNS server IP addresses, etc.). A UE may utilize DHCP to discover the details of one or more ePDGs to connect to. A UE may perform such a DHCP operation/transaction regardless of whether DHCP is being used to also obtain an IP address (e.g., case where UE learns IP address via PCO, case where UE learns IP address through stateless address autoconfiguration).

DHCP may convey one or a combination of the following different types of parameters relating to ePDG/ePDG selection:

IPv4 address of an ePDG server
IPv6 address of an ePDG server
FQDN of an ePDG server
Indication of one of the following:
UE must attempt to use only an HPLMN ePDG
UE must attempt to use only an RPLMN ePDG
UE must attempt to use an HPLMN ePDG, and can attempt to use an RPLMN ePDG if the HPLMN ePDG is unavailable.
UE must attempt to use an RPLMN ePDG, and can attempt to use an HPLMN ePDG if the HPLMN ePDG is unavailable.

A UE may, but need not, indicate its ability/intention/capability/support of ePDG connection/selection in order to receive ePDG related options/parameters from a DHCP server.

Table 16 presents an example where DHCPv4 and DHCPv6 options are defined for conveying ePDG IPv4 and IPv6 addresses, where XXX and YYY indicate reserved numerical values that each uniquely identify the new DHCP option. Similar encoding could be assumed for any of the above listed parameters relating to ePDG/ePDG selection.

2.6.2 Use of ePDG Selection Indicator

Use of the ePDG selection indicator operates in the same manner as described above in section 2.1.3.

2.7 Efficient ePDG Provisioning and Selection

PLMNs are sometimes identified by an FQDN that is not constructed from a PLMN ID as defined in 3GPP TS 23.002 (i.e. MCC and MNC). For example, a PLMN may purchase a service provider that was not a PLMN, so that until such time as the PLMN can operationally upgrade the infrastructure there will be a period of time that a PLMN is advertised using non-PLMN codes. One example method provides for a way for the HPLMN to configure this PLMN in the current data set even if a PLMN has LI requirements but advertises itself via a FQDN. In addition, a VPLMN may identify its ePDGs via FQDNs and a UE may only select an ePDG in a VPLMN using PLMN ID/code or Tracking Area (TA)/Location Area (LA), yet the FQDN is associated with an ePDG. This example method provisions the UE to select an ePDG using an FQDN to allow the VPLMN to meet its LI obligations via existing mechanisms.

2.7.1 Enhanced ePDG Selection Information

The data structure used with known ePDG provisioning is optimized for cases where the ePDG is located in the HPLMN. If the prevailing preference to have the ePDG located in country where the UE is roaming, the size of the provisioning data is enormous. Today, there are about 600 PLMNs and an operator may have to provision 600 PLMNs assuming none of the PLMN like their inbound roamers to select the ePDG in the HPLMN.

The following modifications (underlined) would enhance the known ePDG data structure:

List of <one or more 'listentry'>
'Listentry' contains "PLMN code" or "any_plmn" or "SP-FQDN" or "Country code" and optionally per 'listentry' 'FQDNformat' or 'ePDGlocation'
'FQDNformat' is one of "TA/LA derived" or "PLMN code derived" or "ePDG FQDN"
'ePDGlocation' is one of "mandatory" or "preferred" or "select ePDG in HPLMN first"

The enhanced data structure allows for indicating exceptions to the 'anyPLMN' indicator by specifying the PLMN for which the ePDG needs to be selected in the HPLMN. This could reduce the number of PLMNs to be provisioned.

The enhanced data structure allows for indicating country code of countries where the ePDG needs to be selected in the country itself or, indeed, of countries that are okay with selecting an ePDG in the HPLMN, this data structure also allows for a reduction of the number of PLMNs to be provisioned.

In some PLMNs, ePDG are identified by an FQDN. The enhanced structure would allow to provision preferences for these PLMNs. Some PLMNs are identified by FQDN or NAI as opposed to be PLMN Identifier. The enhanced structure would allow to provision preferences for these PLMNs (in these cases the PLMN may indeed be known as a service provider).

The UE can be provisioned with less PLMN codes using this structure. Procedures are shown in Table 17 which details proposed changes to 3GPP TS 23.402.

Detailed stage 3 procedures and date structures are shown in Table 18. Proposed changes shown below are changes on top of current TS 24.312 (13.0.0).

2.8 IKE

In one example method, IKE is used to instruct the UE to select an ePDG in the VPLMN by the VPLMN when the UE has attached (i.e. has an RPLMN in memory) via 3GPP access to that PLMN. In addition, if the UE has not attached to a PLMN (i.e. the RPLMN has been deleted according to 3GPP TS 23.122 subclause 5), but has authenticated with a PLMN via WLAN, IKE is used to instruct the UE to select an ePDG in that VPLMN.

Where a UE does not use EAP for authentication, the UE may first select an incorrect ePDG (i.e. when the UE is not attached via 3GPP access). Upon receipt of an IKE_AUTH request message from the UE requesting the establishment of a tunnel, the ePDG proceeds with authentication and authorization. The basic procedure is described in 3GPP TS 33.402, while further details are provided in 3GPP TS 24.302.

During the UE's authentication and authorization procedure, the 3GPP AAA server provides to the ePDG an indication about the selected IP mobility mechanism (see 3GPP TS 29.273) and whether authentication should proceed due to the location from which the UE is attempting to establish a tunnel.

Either the ePDG or the HSS can be provisioned with information about LI preferences in the country where the UE resides. ePDG may use IP address to determine an approximation (i.e. country granularity) of the location of the UE. Other means may exist to determine UE location by ePDG or HSS.

In the tunnel establishment procedures, the ePDG can receive an error indication (e.g. DIAMETER_ERROR_non_VPLMN_ePDG_not_allowed) sent by the 3GPP AAA Server. The error indication means the network refuses service to the UE because the country or PLMN the UE is located does not support EPS services from non-3GPP access that are not handled via a ePDG in that country or PLMN. In this case, the ePDG shall include, in the IKE_AUTH response message, a Notify Payload with a Private Notify Message Type—"Current ePDG access to EPC not allowed in PLMN" or "Current ePDG access to EPC not allowed in country."

The IKE_AUTH response message may further include one more IP addresses, SP FQDNs, NAIs, PLMN codes, ePDG FQDNs. These can be used for authentication purposes by the UE, enabling the UE to obtain service via an indicated ePDG or service provider and its ePDG.

As an alternative, the UE's authentication procedure may be successful, but the UE is not authorized to use the selected ePDG for any services (with the possible exception of emergency services). The indication that authentication is successful and a second indication that authorization has failed would allow a UE to trust any redirection information in the form of the one more IP addresses, SP FQDNs, NAIs, PLMN codes, or ePDG FQDNs.

A UE may attempt to connect to an ePDG but the UE may not be allowed to obtain services via that ePDG. Examples include the ePDG does not support the services requested (e.g., emergency) or the UE is in a location from which it is not allowed to obtain services via this ePDG or via this PLMN.

The ePDG may receive an indication from the HSS or AAA Server. The indication may be included in a Result code IE of the Authentication and Authorization Answer message. The indication may be a permanent failure, specified as follows in Table 19 which presents proposed changes to 3GPP TS 29.272.

The ePDG upon receiving the indication or due to configuration sends a second indication, e.g. "PLMN_NOT_ALLOWED" as shown in Table 20 which presents proposed changes to 3GPP TS 24.302.

3. UE Configuration

Figure 11:
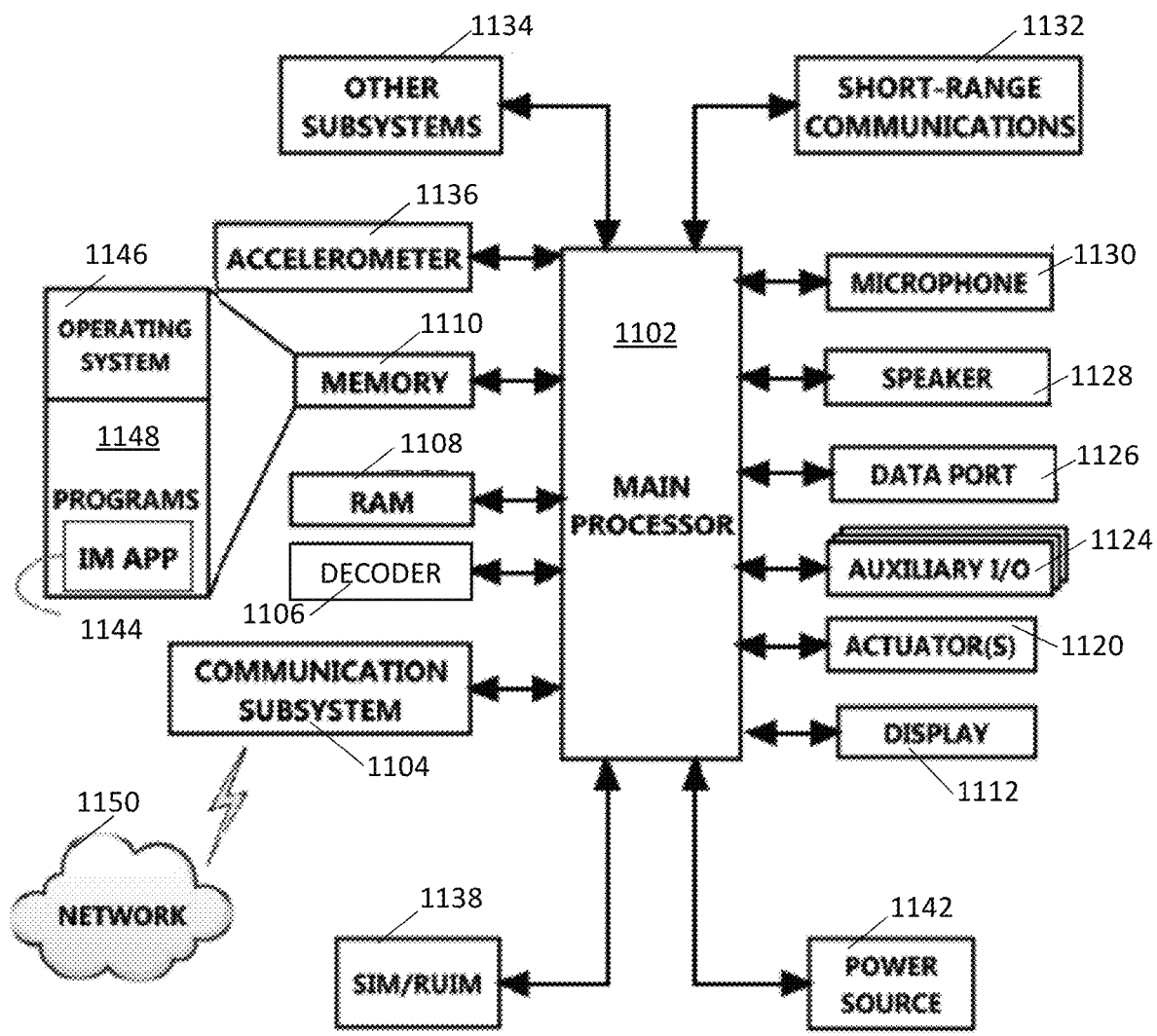
FIG. 11 is a block diagram illustrating an example UE in accordance with one example of the present disclosure.

A block diagram of an example of a wireless communication device 1100, such as UE 602, 702, 802, 903 is shown in FIG. 11. The wireless communication device 1100 includes multiple components, such as a processor 1102 that controls the overall operation of the wireless communication device. Communication functions, including data and voice communications, are performed through a communication subsystem 1104 which includes a communication interface. Data received by the wireless communication device is decompressed and decrypted by a decoder 1106. The communication subsystem 1104 receives messages from and sends messages to a wireless network 1150. The wireless network 1150 may be any type of wireless network, including, but not limited to, data wireless networks, voice wireless networks, and networks that support both voice and data communications. A power source 1142, such as one or more rechargeable batteries or a port to an external power supply, powers the wireless communication device.

The processor 1102 interacts with other components, such as Random Access Memory (RAM) 1108, memory 1110, a display 1112 (which may be a touch-sensitive display), one or more actuators 1120, an auxiliary input/output (I/O) subsystem 1124, a data port 1126, a speaker 1128, a microphone 1130, short-range communications 1132, and other device subsystems 1134. User-interaction with a graphical user interface is performed through the touch-sensitive display 1112. Information, such as text, characters, symbols, images, icons, and other items that may be displayed or rendered on a portable electronic device, is displayed on the touch-sensitive display 1112 via the processor 1102. The processor 1102 may interact with an accelerometer 1136 that may be utilized to detect direction of gravitational forces or gravity-induced reaction forces.

To identify a subscriber for network access, the wireless communication device 1100 uses a Subscriber Identity Module or a Removable User Identity Module (SIM/RUIM) card 1138 for communication with a network, such as the wireless network 1150. Alternatively, user identification information may be programmed into memory 1110.

The wireless communication device 1100 includes an operating system 1146 and software programs or components 118, such as an instant messaging application 1144 that are executed by the processor 1102 and are typically stored in a persistent, updatable store such as the memory 1110. Additional applications or programs may be loaded onto the wireless communication device 1000 through the wireless network 1150, the auxiliary I/O subsystem 1124, the data port 1126, the short-range communications subsystem 1132, or any other suitable subsystem 1134.

A received signal such as a text message, an e-mail message, instant message or web page download is processed by the communication subsystem 1104 and input to the processor 1102. The processor 1102 processes the received signal for output to the display 1112 and/or to the auxiliary I/O subsystem 1124. A subscriber may generate data items, for example e-mail messages, which may be transmitted over the wireless network 1850 through the communication subsystem 1104. For voice communications, the overall operation of wireless communication device 1100 is similar. The speaker 1128 outputs audible information converted from electrical signals, and the microphone 1130 converts audible information into electrical signals for processing.

The touch-sensitive display 1112 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes a capacitive touch-sensitive overlay. The overlay may be an assembly of multiple layers in a stack including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 1112. The processor 1102 may determine attributes of the touch, including a location of a touch. Touch location data may include an area of contact or a single point of contact, such as a point at or near a center of the area of contact. A signal is provided to a display controller (not shown) in response to detection of a touch. A touch may be detected from any suitable contact member, such as a finger, thumb, appendage, or other objects, for example, a stylus, pen, or other pointer, depending on the nature of the touch-sensitive display 1112. Multiple simultaneous touches may be detected.

One or more actuators 1120 may be depressed or activated by applying sufficient force to the actuators 1120 to overcome the actuation force of the actuator. The actuator(s) 1820 may provide input to the processor 1102 when actuated. Actuation of the actuator(s) 1820 may result in provision of tactile feedback.

4. Non-Limiting Embodiments

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module", or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer maybe connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

APPENDIX

| Location Registration Task State | Registration Status | Registered PLMN is |
|---|---|---|
| Updated | Successful | Indicated in the stored registration area identity |
| Idle, No IMSI | Unsuccessful | No registered PLMN (3) (4) |
| Roaming not allowed: | | |
| a) PLMN not allowed | Unsuccessful | No registered PLMN (4) |
| b) LA not allowed or TA not allowed | Indeterminate (1) | No registered PLMN |
| c) Roaming not allowed in this LA or Roaming not allowed in this TA | Indeterminate (2) | No registered PLMN (4) |
| d) No suitable cells in location area or No suitable cells in tracking area | Indeterminate (5) | No registered PLMN |
| e) Not authorized for this CSG | Indeterminate (6) | No registered PLMN |
| Not updated | Unsuccessful | No registered PLMN (4) |

Table 1: Effect of LR Outcomes on PLMN Registration

| | |
|---|---|
| (1) | The MS will perform a cell selection and will eventually either enter a different state when the registration status will be determined, or fail to be able to camp on a new cell, when registration status will be unsuccessful. |
| (2) | The MS will select the HPLMN (if the EHPLMN list is not present or is empty) or an EHPLMN (if the EHPLMN list is present) if in automatic mode and will enter Automatic Network Selection Mode Procedure of subclause 4.4.3.1. If in manual mode, the MS will display the list of available PLMNs and follow the Manual Network Selection Mode Procedure of subclause 4.4.3.1.2 If the appropriate process does not result in registration, the MS will eventually enter the limited service state. |
| (3) | An MS may have different update states for GPRS and non-GPRS. A PLMN is registered when at least one of both update states is updated. |
| (4) | The stored list of equivalent PLMNs is invalid and can be deleted. |
| (5) | The MS will attempt registration on another LA or TA of the same PLMN, or equivalent PLMN if available. Otherwise it will enter either the Automatic Network Selection Mode procedure of subclause 4.4.3.1 or follow the Manual Network Selection Mode procedure of subclause 4.4.3.1.2. If the appropriate process does not result in registration, the MS will eventually enter the limited service state. |
| (6) | The MS will attempt registration on another cell of the same PLMN, or equivalent PLMN if available. Otherwise it will enter either the Automatic Network Selection Mode procedure of subclause 4.4.3.1 or follow the Manual Network Selection Mode procedure of subclause 4.4.3.1.2. If the appropriate process does not result in registration, the MS will eventually enter the limited service state. |
| NOTE 1: | MSs capable of GPRS and non-GPRS services may have different registration status for GPRS and for non-GPRS. |
| NOTE 2: | The registered PLMN is determined by looking at the stored registration area identity and stored location registration status. |

Table 1: Effect of LR Outcomes on PLMN Registration

Table 2 – Proposed changes to 3GPP TS 24.301

Attach changes

5.5.1.2.2 Attach procedure initiation

",,,,,"

If the UE supports SRVCC to GERAN/UTRAN, the UE shall set the SRVCC to GERAN/UTRAN capability bit to "SRVCC from UTRAN HSPA or E-UTRAN to GERAN/UTRAN supported".

If the UE supports VoWLAN, the UE shall set the Voice domain preference to either IMS over WLAN voice only, IMS over LTE preferred, IMS over WLAN secondary or IMS over LTE secondary, IMS over WLAN preferred.

If the UE supports VoWLAN, and the UE has a) non 3GPP connectivity, then the Voice domain preference to either IMS over WLAN voice only, IMS over LTE preferred, IMS over WLAN secondary or IMS over LTE secondary, IMS over WLAN preferred; or b) no non 3GPP connectivity, then the Voice domain preference shall be set to IMS over LTE voice only;

NOTE: non 3GPP connectivity is implementation specific but could be: Non 3GPP radio has been turned on, Non 3GPP radio has associated with the Non 3GPP radio access point or the UE has been assigned an IP address from the Non 3GPP access.

5.5.1.2.4 Attach accepted by the network

........

1$^{st}$ embodiment

The MME shall include the ePDG address IE or an indication in the EPS network feature support that the RPLMN supports ePDG selection in the ATTACH ACCEPT message only if MME supports ePDG selection in the PLMN and if the UE has set the Voice domain preference to either IMS over WLAN voice only, IMS over LTE preferred, IMS over WLAN secondary or IMS over LTE secondary, IMS over WLAN preferred.

2$^{nd}$ embodiment

The network informs the UE about the support of specific features, such as IMS voice over PS session, ePDG selection indication, location services (EPC-LCS, CS-LCS) or emergency bearer services, in the EPS network feature support information element. In a UE with IMS voice over PS capability, the IMS voice over PS session indicator and the emergency bearer services indicator shall be provided to the upper layers. The upper layers take the IMS voice over PS session indicator into account as specified in 3GPP TS 23.221, subclause 7.2a and subclause 7.2b, when selecting the access domain for voice sessions or calls. When initiating an emergency call, the upper layers also take both the IMS voice over PS session indicator and the emergency bearer services indicator into account for the access domain selection. In a UE with LCS capability, location services indicators (EPC-LCS, CS-LCS) shall be provided to the upper layers. When MO-LR procedure is triggered by the UE's application, those indicators are taken into account as specified in 3GPP TS 24.171. <u>In a UE that supports non-3GPP access using untrusted access as defined in 3GPP TS 24.302, and the UE receives:</u>

<u>a) an indication in the EPS network feature support that the RPLMN supports ePDG selection, the ePDG selection indication; or</u>

<u>b) the ePDG address IE, the ePDG address shall be taken into account by the upper layers as defined in 3GPP TS 24.302 sub-clause 4.5.4.4.</u>

<u>Tracking area update changes</u>

5.5.3.2.2   Normal and periodic tracking area updating procedure initiation

The UE in state EMM-REGISTERED shall initiate the tracking area updating procedure by sending a TRACKING AREA UPDATE REQUEST message to the MME,

………

- s) when the UE needs to update the network with EPS bearer context status due to local de-activation of EPS bearer context(s) as specified in subclause 6.5.1.4A.

- <u>t)   when the UE obtains non 3GPP connectivity and supports VoWLAN.</u>

For all cases except case b, the UE shall set the EPS update type IE in the TRACKING AREA UPDATE REQUEST message to "TA updating". For case b, the UE shall set the EPS update type IE to "periodic updating".

…….

If the UE supports PSM and decides to activate it, the UE shall include the T3324 value IE in the TRACKING AREA UPDATE REQUEST message. When the UE includes the T3324 value IE, it may also include the T3412 extended value IE to request a particular T3412 value to be allocated.

<u>If the UE supports VoWLAN, and the UE has</u> a) non 3GPP connectivity then the Voice domain preference to either IMS over WLAN voice only, IMS over LTE preferred, IMS over WLAN secondary or IMS over LTE secondary, IMS over WLAN preferred; or b) no non 3GPP connectivity then the Voice domain preference shall be set to IMS over LTE voice only;

NOTE: non 3GPP connectivity is implementation specific but could be: Non 3GPP radio has been turned on, Non 3GPP radio has associated with the Non 3GPP radio access point or the UE has been assigned an IP address from the Non 3GPP access.

.......

5.5.3.2.4     Normal and periodic tracking area updating procedure accepted by the network

.......

If the UE specific DRX parameter was included in the DRX Parameter IE in the TRACKING AREA UPDATE REQUEST message, the network shall replace any stored UE specific DRX parameter with the received parameter and use it for the downlink transfer of signalling and user data.

If the UE Voice domain preference to either IMS over WLAN voice only, IMS over LTE preferred, IMS over WLAN secondary or IMS over LTE secondary, IMS over WLAN preferred; the MME shall include in the TRACKING AREA UPDATE ACCEPT message:

a) an indication in the EPS network feature support that the RPLMN supports ePDG selection, the ePDG selection indication; or b) the ePDG address IE, the ePDG address shall be taken into account by the upper layers as defined in 3GPP TS 24.302 sub-clause 4.5.4.4.

8.2.1    Attach accept 8.2.1.1 Message definition

This message is sent by the network to the UE to indicate that the corresponding attach request has been accepted. See table 8.2.1.1.

Message type:        ATTACH ACCEPT

Significance:                dual

Direction: network to UE

Table 8.2.1.1: ATTACH ACCEPT message content

| IEI | Information Element | Type/Reference | Presence | Format | Length |
|---|---|---|---|---|---|
| | Protocol discriminator | Protocol discriminator 9.2 | M | V | ½ |
| | ….. | …… | ….. | | |
| F1 | T3324 value | GPRS timer 9.9.3.16 | O | TV | 2 |
| | ePDG address | ePDG address 9.9.3.X | O | TLV | N |

9.9.3.12A    EPS network feature support

The purpose of the EPS network feature support information element is to indicate whether certain features are supported by the network.

The EPS network feature support information element is coded as shown in figure 9.9.3.12A.1 and table 9.9.3.12A.1.

The EPS network feature support is a type 4 information element with a length of 3 octets.

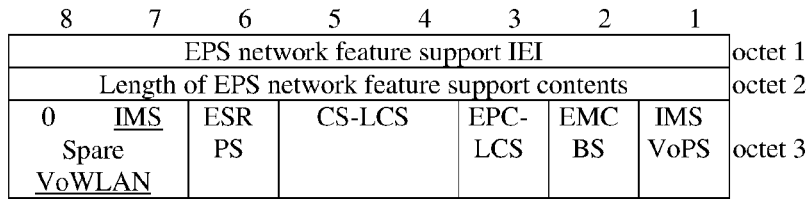

Figure 9.9.3.12A.1: EPS network feature support information element

Table 9.9.3.12A.1: EPS network feature support information element

IMS voice over PS session indicator (IMS VoPS) (octet 3, bit 1)

Bit
1
0      IMS voice over PS session in S1 mode not supported
1      IMS voice over PS session in S1 mode supported Emergency bearer services indicator (EMC BS) (octet 3, bit 2)

Bit

| | |
|---|---|
| 2<br>0     emergency bearer services in S1 mode not supported<br>1     emergency bearer services in S1 mode supported<br><br>Location services indicator in EPC (EPC-LCS) (octet 3, bit 3)<br><br>Bit<br>3<br>0     location services via EPC not supported<br>1     location services via EPC supported<br><br>Location services indicator in CS (CS-LCS) (octet 3, bit 4 to 5)<br><br>Bit<br><br>5  4<br>0  0     no information about support of location services via CS domain is available<br>0  1     location services via CS domain supported<br>1  0     location services via CS domain not supported<br>1  1     reserved<br><br>Support of EXTENDED SERVICE REQUEST for packet services (ESRPS) (octet3, bit6)<br><br>Bit<br>6<br>0     network does not support use of EXTENDED SERVICE REQUEST to request for packet services<br>1     network supports use of EXTENDED SERVICE REQUEST to request for packet services | |
| <u>Bit<br>7<br>0     VoWLAN not supported<br>1     VoWLAN supported</u> | <u>9.9.3.X ePDG address</u><br><br><u>The purpose of the ePDG address information element is to carry the address of the ePDG to be used in the PLMN. The address may either be an FQDN or an IP address</u><br><br><u>The ePDG address information element is coded as shown in figure 9.9.3.X.1 and table 9.9.3.X.1.</u> |
| Location services indicator in EPC (EPC-LCS) (octet 3, bit 3)<br><br>Bit<br><br><br><br>Bits 8 of octet 3 are spare and shall be coded all zero. | |

<u>The ePDG address is a type 4 information element with a length of 3 octets.</u>

<u>8   7   6   5   4   3   2   1</u>

| ePDG address IEI | | | | | | | | octet 1 |
|---|---|---|---|---|---|---|---|---|
| Length of ePDG address contents | | | | | | | | octet 2 |
| 0 Spare | 0 Spare | 0 Spare | 0 Spare | 0 | IPv6 | IPv4 | FQDN | octet 3 |
| | | | | | | | | Octet 4 |
| | | | | | | | | Octet n |

Figure 9.9.3.X.1: ePDG address information element

Table 9.9.3.X.1: ePDG address element

FQDN address (octet 3, bit 1)

Bit
1
0         No FQDN included
1         FQDN included

IPv4 address (octet 3, bit 2)

Bit
2
0         No IPv4 address
1         IPv4 address

IPv6 address (octet 3, bit 3)

Bit
3
0         No IPv6 address
1         IPv6 address

Bits 4 to 8 of octet 3 are spare and shall be coded all zero.

If ePDG address information element indicates IPv4, the Address information in octet 4 to octet 7 contains the IPv4 address. Bit 8 of octet 7 represents the most significant bit of the IP address and bit 1 of octet 7 the least significant bit.

If ePDG address information element indicates IPv6, the Address information in octet 4 to octet 19 contains the IPv6 address. Bit 8 of octet 4 represents the most significant bit of the IP address and bit 1 of octet 19 the least significant bit.

Table 2 – Proposed changes to 3GPP TS 24.301

Table 3 – Proposed changes to 3GPP TS 24.008

*10.5.5.28    Voice domain preference and UE's usage setting*

The purpose of the *Voice domain preference and UE's usage setting* information element is to provide the network with the UE's usage setting and the voice domain preference for E-UTRAN. The network uses the UE's usage setting and the voice domain preference for E-UTRAN only to select the RFSP index.

The UE's usage setting bit indicates the value configured on the ME as defined in 3GPP TS 23.221.

The voice domain preference for E-UTRAN bit indicates the value configured on the ME of the Voice domain preference for E-UTRAN as defined in 3GPP TS 24.167.

Figure 10:
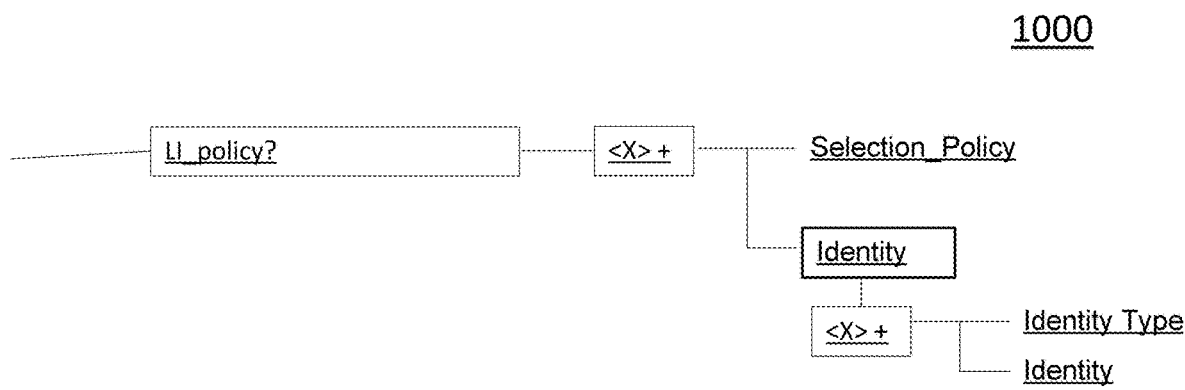
FIG. 10 is an example data model illustrating how a Lawful Intercept (LI) policy could be stored in an application according to one example of the present disclosure.

The *Voice domain preference and UE's usage setting* information element is coded as shown in figure 10.5.151A/3GPP TS 24.008 and table 10.5.166A/3GPP TS 24.008.

| 8 | 7 | 6 | 5 | 4 | 3 | 2 | 1 | |
|---|---|---|---|---|---|---|---|---|
| colspan Voice domain preference and UE's usage setting IEI ||||||| | octet 1 |
| Length of Voice domain preference and UE's usage setting contents |||||||| octet 2 |
| 0 Spare | 0 Spare | 0 Spare | VoWLAN Preference || UE's usage setting | Voice domain preference for E-UTRAN || octet 3 |

Figure 10.5.151A/3GPP TS 24.008: *Voice domain preference and UE's usage setting* information element

Table 10.5.166A/3GPP TS 24.008: *Voice domain preference and UE's usage setting* information element

| Voice domain preference and UE's usage setting value (octet 3, bit 1 to 3) |
|---|
| UE's usage setting (1 bit field) |
| Bit |
| 3 |
| 0    Voice centric |
| 1    Data centric |
| |
| Voice domain preference for E-UTRAN (2 bit field) |
| |
| Bit |
| 2  1 |
| 0  0    CS Voice only |
| 0  1    IMS PS Voice only |

| | | |
|---|---|---|
| 1 | 0 | CS voice preferred, IMS PS Voice as secondary |
| 1 | 1 | IMS PS voice preferred, CS Voice as secondary |

MS not supporting IMS voice shall indicate "CS Voice only".
MS only supporting IMS voice shall indicate "IMS PS Voice only".

| Bit | | |
|---|---|---|
| 4 | 5 | |
| 0 | 0 | IMS over LTE Voice only, |
| 0 | 1 | IMS over WLAN Voice only, |
| 1 | 0 | IMS over LTE preferred, IMS over WLAN secondary |
| 1 | 1 | IMS over LTE secondary, IMS over WLAN preferred |

Table 3 – Proposed changes to 3GPP TS 24.008

Table 4 – Proposed changes to 3GPP TS 24.008

10.5.6.3 Protocol configuration options

…..

Table 10.5.154/3GPP TS 24.008: *Protocol configuration options* information element

Configuration protocol (octet 3)

Bits 3 2 1

0 0 0     PPP for use with IP PDP type or IP PDN type (see 3GPP TS 24.301)

…..

Configuration protocol options list (octets 4 to w)

The *configuration protocol options list* contains a variable number of logical units, they may occur in an arbitrary order within the *configuration protocol options list*.

……

Additional parameters list (octets w+1 to z)

The *additional parameters list* is included when special parameters and/or requests (associated with a PDP context) need to be transferred between the MS and the network. These parameters and/or requests are not related to a specific configuration protocol (e.g. PPP), and therefore are not encoded as the "Packets" contained in the *configuration protocol options list*.

The *additional parameters list* contains a list of special parameters, each one in a separate container. The type of the parameter carried in a container is identified by a specific *container identifier*. In this version of the protocol, the following container identifiers are specified:

MS to network direction:

-        0001H (P-CSCF IPv6 Address Request);

…….

| | |
|---|---|
| | - 0014H (NBIFOM mode); ~~and~~<br><br>- <u>0015H (ePDG selection or VoWLAN supported); and</u><br><br>- FF00H to FFFFH reserved for operator specific use.<br><br><br>Network to MS direction:<br><br>- 0001H (P-CSCF IPv6 Address);<br><br>……<br><br>- 0014H <u>ePDG selection indicator</u> ~~(Reserved)~~; and<br><br>- 0015H (Reserved); and<br><br>- FF00H to FFFFH reserved for operator specific use.<br><br><br>NOTE: ePDG selection indicator is specified to be a number of different items per section x.y.z. The text below represents the possible different implementations<br><br>……..<br><br><u>When the *container identifier* indicates ePDG IPv6 address, the *container identifier contents* field contains one ePDG IPv6 address. This IPv6 address is encoded as an IPv6 address according to IETF RFC 4291.</u><br><br><u>When the *container identifier* indicates ePDG IPv4 address, the *container identifier contents* field contains one ePDG IPv4 address. This IPv4 address is encoded as an IPv4 address according to IETF RFC XXXX.</u><br><br><u>When the *container identifier* indicates ePDG FQDN address, the *container identifier contents* field contains one FQDN address. This ePDG FQDN is encoded as an FQDN address according to IETF RFC XXXX.</u> | |

Table 4 – Proposed changes to 3GPP TS 24.008

Table 5 – Proposed changes to 3GPP TS 29.212

---

5.3.113 ePDG support or VoWLAN support AVP

The ePDG support or VoWLAN support AVP (AVP code 2826) is of type Unsigned32, and it indicates whether the UE requires an ePDG address.

The following values are defined in this specification:

0 (No ePDG address required):

This value shall be used to indicate that the UE does not require an ePDG address. It shall be present if PCO as defined in 3GPP TS 24.008 does not contain value 0015H.

1 (ePDG address required):

This value shall be used to indicate that the UE does require an ePDG address. It shall be present if PCO as defined in 3GPP TS 24.008 does contain value 0015H 5.3.114 ePDG selection indicator AVP The ePDG selection indicator support AVP (AVP code 2827) is of type Unsigned32, and it indicates whether the UE requires an ePDG address.

The following values are defined in this specification:

0 (No ePDG address required):

This value shall be used to indicate that the UE does not require an ePDG address. It shall be present if PCO as defined in 3GPP TS 24.008 does not contain value 0015H.

1 (ePDG address required):

This value shall be used to indicate that the UE does require an ePDG address. It shall be present if PCO as defined in 3GPP TS 24.008 does contain value 0015H 5.3.115 ePDG selection indicator The Routing-Rule-Install AVP (AVP code 2828) is of type Grouped, and it is used to convey/send the ePDG from the PCEF to the PCRF.

AVP Format:

Routing-Filter ::= < AVP Header: 1078 >
                        *[ ePDG-FQDN ]
                        *[ ePDG-IP-address ]
                        *[ AVP ]

5.3.116 ePDG-IP-address AVP

The ePDG-IP-Address AVP (AVP Code 2828) is of type Address and contains the ePDG node's address. The address type may be Ipv4 or Ipv6.

5.3.117 ePDG-FQDN

The ePDG-IP-Address AVP (AVP Code 2829) is of type Address and contains the ePDG node's address. The address type may be FQDN.

5.6.2 CC-Request (CCR) Command

The CCR command, indicated by the Command-Code field set to 272 and the 'R' bit set in the Command Flags field, is sent by the PCEF to the PCRF in order to request PCC rules for a bearer and provision IP flow mobility routing rules. The CCR command is also sent by the PCEF to the PCRF in order to indicate bearer, PCC rule or IP flow mobility routing rule related events or the termination of the IP CAN bearer and/or session.

Message Format:

<CC-Request> ::= < Diameter Header: 272, REQ, PXY >
                < Session-Id >
                { Auth-Application-Id }
                { Origin-Host }
                { Origin-Realm }
.......
                *[ Proxy-Info ]
                *[ Route-Record ]
                *[ ePDG support or VoWLAN SUpport ]
                *[ AVP ]

NOTE: Multiple instances of the Subscription-Id AVP in the CCR command correspond to multiple types of identifier for the same subscriber, for example IMSI and MSISDN.

5.6.3 CC-Answer (CCA) Command

The CCA command, indicated by the Command-Code field set to 272 and the 'R' bit cleared in the Command Flags field, is sent by the PCRF to the PCEF in response to the CCR command. It is used to provision PCC rules and event triggers for the bearer/session and to provide the selected bearer control mode for the IP-CAN session. If the PCRF performs the bearer binding, PCC rules will be provisioned at bearer level. The primary and secondary CCF and/or primary and secondary OCS addresses may be included in the initial provisioning.

Message Format:

<CC-Answer> ::= < Diameter Header: 272, PXY >
    < Session-Id >
    { Auth-Application-Id }
    { Origin-Host }
......
    *[ Failed-AVP ]
    *[ Proxy-Info ]
    *[ Route-Record ]
    <u>*[ ePDG selection indication]</u>

*[ AVP ]

Table 5 – Proposed changes to 3GPP TS 29.212

Table 6 – Proposed changes to 3GPP TS 23.401

---

5.3.2    Attach procedure 5.3.2.1    E-UTRAN Initial Attach

17. If an APN Restriction is received, then the MME shall store this value for the Bearer Context and the MME shall check this received value with the stored value for the Maximum APN Restriction to ensure there are no conflicts between values. If the Bearer Context is accepted, the MME shall determine a (new) value for the Maximum APN Restriction. If there is no previously stored value for Maximum APN Restriction, then the Maximum APN Restriction shall be set to the value of the received APN Restriction. MME shall not deactivate bearer(s) with emergency ARP, if present, to maintain valid APN restriction combination.

The P-GW shall ignore Maximum APN restriction if the request includes the Emergency APN.

If the MS Info Change Reporting Action (Start) and/or the CSG Information Reporting Action (Start) are received for this bearer context, then the MME shall store this for the bearer context and the MME shall report to that P-GW via the S-GW whenever a UE's location and/or User CSG information change occurs that meets the P-GW request, as described in clause 15.1.1a of TS 23.060. If Presence Reporting Area Action is received for this bearer context, the MME shall store this information for the bearer context and shall report to that P-GW via the S-GW whenever a change of UE presence in Presence Reporting Area is detected, as described in clause 5.9.2.2.

The MME determines the UE AMBR to be used by the eNodeB based on the subscribed UE-AMBR and the APN-AMBR for the default APN, see clause 4.7.3.

For emergency attach the MME determines the UE-AMBR to be used by the eNodeB from the APN AMBR received from the S-GW.

If new MME hasn't received, from Step 12, Voice Support Match Indicator for the UE from the eNB then, based on implementation, the MME may set IMS Voice over PS session supported Indication and update it at a later stage.

The new MME sends an Attach Accept (APN, GUTI, PDN Type, PDN Address, TAI List, EPS Bearer Identity, Session Management Request, Protocol Configuration Options, NAS sequence number, NAS-MAC, IMS Voice over PS session supported Indication, ePDG/VoWLAN support indicator (ePDG selection indicator), Emergency Service Support indicator, LCS Support Indication) message to the eNodeB. GUTI is included if the new MME allocates a new GUTI. This message is contained in an S1_MME control message Initial Context Setup Request. This S1 control message also includes the AS security context information for the UE, the Handover Restriction List, the EPS Bearer QoS, the UE-AMBR, EPS Bearer Identity, as well as the TEID at the Serving GW used for user plane and the address of the Serving GW for user plane. In addition, if the PDN connection is established for Local IP Access, the corresponding S1 control message includes a Correlation ID for enabling the direct user plane path between the HeNB and the L-GW. If the PDN connection is established for SIPTO at the Local Network with L-GW function collocated with the (H)eNB, the corresponding S1 control message includes a SIPTO Correlation ID for enabling the direct user plane path between the (H)eNB and the L-GW.

NOTE 12: In this release of the 3GPP specification the Correlation ID and SIPTO Correlation ID is set equal to the user plane PDN GW TEID (GTP-based S5) or GRE key (PMIP-based S5) that the MME has received in step 16.

In the Attach Accept message, the MME does not include the IPv6 prefix within the PDN Address. The MME includes the EPS Bearer QoS parameter QCI and APN-AMBR into the Session Management Request. Furthermore, if the UE has UTRAN or GERAN capabilities and the network supports mobility to UTRAN or GERAN, the MME uses the EPS bearer QoS information to derive the corresponding PDP context parameters QoS Negotiated (R99 QoS profile), Radio Priority, Packet Flow Id and TI and includes them in the Session Management Request. If the UE indicated in the UE Network Capability it does not support BSS packet flow procedures, then the MME shall not include the Packet Flow Id. Handover Restriction List is described in clause 4.3.5.7 "Mobility Restrictions". The MME sets the IMS Voice over PS session supported Indication as described in clause 4.3.5.8. The MME sets the ePDG/VoWLAN support indicator (ePDG selection indicator) as described in clause 4.3.5.8b, LCS Support Indication indicates whether the network supports the EPC-MO-LR and/or CS-MO-LR as described in TS 23.271. The MME may include an indication whether the traffic of this PDN Connection is allowed to be offloaded to WLAN, as described in clause 4.3.23.

5.3.3 Tracking Area Update procedures 5.3.3.1 Tracking Area Update procedure with Serving GW change 20. If due to regional subscription restrictions or access restrictions (e.g. CSG restrictions) the UE is not allowed to access the TA:

- The MME rejects the Tracking Area Update Request with an appropriate cause to the UE.

- For UEs with emergency EPS bearers, i.e. at least one EPS bearer has an ARP value reserved for emergency services, the new MME accepts the Tracking Area Update Request and deactivates all non-emergency PDN connections as specified in clause 5.10.3. If the Tracking Area Update procedure is initiated in ECM-IDLE state, all non-emergency EPS bearers are deactivated by the Tracking Area Update procedure without bearer deactivation signalling between the UE and the MME.

The MME sends a TAU Accept (GUTI, TAI list, EPS bearer status, NAS sequence number, NAS-MAC, IMS Voice over PS session supported, <u>ePDG/VoWLAN support indicator (ePDG selection indicator),</u> Emergency Service Support indicator, LCS Support Indication) message to the UE. If the active flag is set the MME may provide the eNodeB with Handover Restriction List. GUTI is included if the MME allocates a new GUTI. If the active flag is set in the TAU Request message the user plane setup procedure can be activated in conjunction with the TAU Accept message. If the DL Data Buffer Expiration Time for the UE in the MME has not expired, the user plane setup procedure is activated even if the MME did not receive the active flag in the TAU Request message. If the new MME receives the Downlink Data Notification message or any downlink signalling message while the UE is still connected, the user plane setup procedure may be activated even if the new MME did not receive the active flag in the TAU Request message. The procedure is described in detail in TS 36.300. The message sequence should be the same as for the UE triggered Service Request procedure specified in clause 5.3.4.1 from the step when MME establishes the bearer(s). The MME indicates the EPS bearer status IE to the UE. The UE removes any internal resources related to bearers that are not marked active in the received EPS bearer status. Handover Restriction List is described in clause 4.3.5.7 "Mobility Restrictions". The MME sets the IMS Voice over PS session supported as described in clause 4.3.5.8.

5.3.3.2 E-UTRAN Tracking Area Update without S-GW Change

20. If due to regional subscription restrictions or access restrictions (e.g. CSG restrictions) the UE is not allowed to access the TA:

- The MME rejects the Tracking Area Update Request with an appropriate cause to the UE.

- For UEs with emergency EPS bearers, i.e. at least one EPS bearer has an ARP value reserved for emergency services, the new MME accepts the Tracking Area Update Request and deactivates all non-emergency PDN connections as specified in clause 5.10.3. If the Tracking Area Update procedure is initiated in ECM-IDLE state, all non-emergency EPS bearers are deactivated by the Tracking Area Update procedure without bearer deactivation signalling between the UE and the MME.

The MME responds to the UE with a Tracking Area Update Accept (GUTI, TAI-list, EPS bearer status, NAS sequence number, NAS-MAC, ISR Activated, IMS Voice over PS session supported, ePDG/VoWLAN support indicator (ePDG selection indicator), Emergency Service Support indicator, LCS Support Indication) message. If the active flag is set the Handover Restriction List may be sent to eNodeB as eNodeB handles the roaming restrictions and access restrictions in the Intra E-UTRAN case. If the active flag is set in the TAU Request message the user plane setup procedure is activated in conjunction with the TAU Accept message. If this is a Tracking Area Update without MME change and the DL Data Buffer Expiration Time in the MM context for the UE in the MME has not expired, or if this is a Tracking Area Update with MME change and the old MME/old S4-SGSN indicated Buffered DL Data Waiting in the Context Response in step 5, the user plane setup procedure is activated even if the MME did not receive the active flag in the TAU Request message. If the new MME receives the Downlink Data Notification message or any downlink signalling message while the UE is still connected, the user plane setup procedure may be activated even if the new MME did not receive the active flag in the TAU Request message. The procedure is described in detail in TS 36.300. The message sequence should be the same as for the UE triggered Service Request procedure specified in clause 5.3.4.1 from the step when MME establish the bearers(s). The EPS bearer status indicates the active bearers in the network. The UE removes any internal resources related to bearers not marked active in the received EPS bearer status. If ISR Activated is indicated to the UE, this indicates that its P-TMSI and RAI shall remain registered with the network and shall remain valid in the UE. At a Tracking Area Update with an MME change ISR Activated shall not be indicated. At a Tracking Area Update without an MME change, if ISR is activated for the UE when the MME receives the Tracking Area Update Request, the MME should maintain ISR by indicating ISR Activated in the Tracking Area Update Accept message. Handover Restriction List is described in clause 4.3.5.7 "Mobility Restrictions". The MME sets the IMS Voice over PS session supported as described in clause 4.3.5.8. The MME sets the ePDG/VoWLAN support indicator (ePDG selection indicator) as described in clause 4.3.5.8b The MME checks if there is a "Availability after DDN Failure" monitoring event or a "UE Reachability" monitoring event configured for the UE in the MME for which an event notification has not yet been sent. In such a case an event notification is sent (see TS 23.682 for further information).

4.3.5.8bIMS voice over WLAN Session (ePDG/VoWLAN) Supported Indication

The serving PLMN shall send an indication toward the UE during the Attach procedure and Tracking Area Update procedures if an IMS voice over WLAN session is supported or IMS voice over WLAN session is not supported. The UE shall store this indication against the RPLMN that provided the indication The UE shall delete the indication if the RPLMN is no longer valid per 3GPP TS 23.122 subclause 5 i.e. no registered PLMN.

A UE with "IMS voice over WLAN" voice capability should take this indication into account when establishing voice over WLAN sessions using ePDG selection as specified in 3GPP TS 23.402 sub-clause 4.5.4.4.

The serving PLMN provides this indication based e.g. on local policy, subscription information received from the HSS. The serving PLMN shall indicate to the UE that the UE can expect a successful IMS voice over WLAN only if the MME is configured to know that the serving PLMN has a roaming agreement for IMS voice over WLAN with the HPLMN of the UE.

Alternative embodiment

*4.3.5.8bePDG Supported Indication (eSI)*

The serving PLMN shall send an indication toward the UE during the Attach procedure and Tracking Area Update procedures if ePDG selection in the PLMN is supported or if ePDG selection in the PLMN is not supported. The UE shall store this indication against the RPLMN that provided the indication. The UE shall delete the indication if the RPLMN is no longer valid per 3GPP TS 23.122 subclause 5 i.e. no registered PLMN.

A UE with ePDG selection support as specified in 3GPP TS 23.402 subclause 4.5.4.4 shall take this indication into account when establishing an ePDG connection as specified in 3GPP TS 23.402 sub- > clause 4.5.4.4.
>
> The serving PLMN provides this indication based e.g., on local policy, subscription information received from the HSS. The serving PLMN shall indicate to the UE that the UE can expect a successful ePDG connection if the MME is configured to know that the serving PLMN has a roaming agreement for ePDG selection with the HPLMN of the UE.

Table 6 – Proposed changes to 3GPP TS 23.401

Table 7 – Proposed changes to 3GPP TS 23.402

---

4.5.4.4 UE ePDG Selection Procedure

When constructing an FQDN, the UE shall construct the FQDN as described in clause 4.5.4.2.

If the UE receives a) an indication from the NAS lower layers that IMS voice over WLAN Session Supported Indication is supported by the RPLMN (see 3GPP TS 23.401 sub-clause 4.3.5.8b), then the UE shall i) If the UE is attached via 3GPP access to a PLMN that A) is in the ePDG selection information defined in point 2) in clause 4.5.4.3 (including the case when there is "any PLMN" value in the ePDG selection information), the UE shall select the ePDG in the PLMN by constructing an FQDN as described in clause 4.5.4.2, and using the DNS server function to obtain the IP address(es) of the ePDG(s) in the PLMN; or B) Not in the ePDG selection information defined in point 2) in clause 4.5.4.3 then the UE shall select the ePDG in the PLMN by constructing an operator identifier FQDN using the PLMN ID that the UE is attached to and using the DNS server function to obtain the IP address(es) of the ePDG(s) in the PLMN; or ii) Received an A) FQDN address, then the UE shall use that FQDN in the DNS server request to obtain the IP address(es) of the ePDG(s) in the PLMN; or B) IP address then the UE shall use that IP address to set-up an IPSec tunnel to the ePDG.

iii) In all other cases, including the UE not attached to any PLMN via 3GPP access, the UE shall select the ePDG of the HPLMN by constructing the FQDN according to clause 4.5.4.2, and use the DNS server function to obtain the IP address(es) of the ePDG(s) in the HPLMN. If no HPLMN or "any PLMN" value is present in the ePDG selection information, the UE construct the Operator Identifier FQDN for HPLMN; or b) does not receive an indication from the NAS lower layers then the UE shall perform ePDG selection by executing the steps below in the following order:

1) If the UE is configured with an FQDN or IP address in the ePDG identifier configuration defined in point 1) in clause 4.5.4.3, then the UE shall attempt to select in ePDG in the HPLMN. The UE shall either use the configured FQDN and use the DNS server function to obtain the IP address(es) of the ePDG(s) in the HPLMN, or the UE shall use the configured IP address.

2) If the UE is attached via 3GPP access to a PLMN-x and (a) PLMN-x is included in the ePDG selection information defined in point 2) in clause 4.5.4.3, or (b) PLMN-x is not included in the ePDG selection information but the ePDG selection information includes the "any PLMN" entry, then the UE shall attempt to select an ePDG in this PLMN-x. The UE shall construct an ePDG FQDN for this PLMN-x as described in clause 4.5.4.2, and shall use the DNS server function to obtain the IP address(es) of the ePDG(s).

2a) If the UE has performed "3GPP-based access authentication" (see e.g. subclause 4.8.2b) with a PLMN that is in the ePDG selection information defined in point 2) in clause 4.5.4.3 (including the case when there is "any PLMN" value in the ePDG selection information), the UE shall select the ePDG in the PLMN by constructing an FQDN as described in clause 4.5.4.2, and using the DNS server function to obtain the IP address(es) of the ePDG(s) in the PLMN; otherwise.

3) In all other cases, including the case when the UE is not attached to any PLMN via 3GPP access, the UE shall attempt to select an ePDG in the HPLMN. The UE shall construct an ePDG FQDN for the HPLMN according to clause 4.5.4.2, and shall use the DNS server function to obtain the IP address(es) of the ePDG(s). If no HPLMN or "any PLMN" entry is present in the ePDG selection information, the UE shall construct the Operator Identifier FQDN for HPLMN.

NOTE 1: According to the steps above, the home operator can configure the UE to always select an ePDG in the HPLMN, for example, by:

- providing neither the ePDG identifier configuration nor the ePDG selection information, in which case the UE always selects an ePDG in HPLMN by using the Operator Identifier FQDN, according to step 3) above; or

- providing ePDG identifier configuration, in which case the UE always selects an ePDG in HPLMN based on the FQDN or IP address in the ePDG identifier configuration, according to step 1) above.

> NOTE 2: According to the steps above, the home operator can configure the UE to attempt first to select an ePDG in the VPLMN, for example, by:
>
> - not providing the ePDG identifier configuration, and
>
> - providing the ePDG selection information containing the "any PLMN" entry and the indication of "preferred".

Table 7 – Proposed changes to 3GPP TS 23.402

Table 8 – Proposed changes to 3GPP TS 23.402

> *4.5.4.4 UE ePDG Selection Procedure*
>
> When constructing an FQDN, the UE shall construct the FQDN as described in clause 4.5.4.2.
>
> If the UE receives
>
> a) an indication that the IMS voice over WLAN Session Supported Indication is supported by the RPLMN and the IMS voice over WLAN Session Supported Indication indicates IMS voice over WLAN is supported (see 3GPP TS 23.401 sub-clause 4.3.5.8b), then the UE shall
>
>   i) If the UE is attached via 3GPP access to a PLMN that:
>
>     A) is in the ePDG selection information defined in point 2) in clause 4.5.4.3 (including the case when there is "any PLMN" value in the ePDG selection information), the UE shall select the ePDG in the PLMN by constructing an FQDN as described in clause 4.5.4.2, and using the DNS server function to obtain the IP address(es) of the ePDG(s) in the PLMN; or
>
>     B) Not in the ePDG selection information defined in point 2) in clause 4.5.4.3 then the UE shall select the ePDG in the PLMN by constructing an operator identifier FQDN using the PLMN ID that the UE is attached to and using the DNS server function to obtain the IP address(es) of the ePDG(s) in the PLMN; or
>
>   ii) In all other cases, including the UE not attached to any PLMN via 3GPP access, the UE shall select the ePDG of the HPLMN by constructing the FQDN according to clause 4.5.4.2, and use the DNS server function to obtain the IP address(es) of the ePDG(s) in the HPLMN. If no HPLMN or "any PLMN" value is present in the ePDG selection information, the UE construct the Operator Identifier FQDN for HPLMN; or
>
> b) does not receive an indication that the IMS voice over WLAN Session Supported Indication is supported by the RPLMN or receives an indication that the IMS voice over WLAN Session Supported Indication is supported by the RPLMN and the IMS voice over WLAN Session Supported Indication indicates IMS voice over WLAN is not supported (see 3GPP TS 23.401 sub-clause 4.3.5.8b) the UE shall perform ePDG selection by executing the steps below in the following order: ......

Table 8 – Proposed changes to 3GPP TS 23.402

| 3GPP 23.122 State | 3GPP 24.302 State | 3GPP 24.008 |
|---|---|---|
| Updated | EMM REGISTERED | GMM REGISITERED |

Table 9 – State mapping

Table 10 – Proposed changes to 3GPP TS 24.302 based on C1-153983

7.2.1 Selection of the ePDG

The UE performs ePDG selection based on the ePDG configuration information configured by the home operator in the UE either via H-ANDSF or via USIM or via implementation specific means. The ePDG configuration information may consist of home ePDG identifier or ePDG selection information or both:

- when configured via H-ANDSF, the ePDG configuration information is provisioned in ePDG node under Home Network Preference as specified in 3GPP TS 24.312; and

- when configured via USIM, the ePDG configuration information is provisioned in $EF_{ePDGId}$ and $EF_{ePDGSelection}$ files as specified in 3GPP TS 31.102.

NOTE 1: Implementation specific means apply only if the configurations via H-ANDSF and USIM are not present.

The UE shall support the implementation of standard DNS mechanisms in order to retrieve the IP address(es) of the ePDG. The input to the DNS query is an ePDG FQDN as specified in subclause 4.4.3 and in 3GPP TS 23.003.

The UE proceeds as follows:

a) if the UE is ~~attached~~ in the Updated state as specified in 3GPP TS 23.122: and an ePDG selection indicator was received from the non-access stratum layer as defined in 3GPP TS 24.301 then the UE shall:

1) if ePDG selection indicator was an indication e.g., single bit that ePDG selection should be performed in the RPLMN, then:

i) if the RPLMN MCC, MNC matches the MCC MNC of the IMSI stored in the $EF_{IMSI}$ or $EF_{EHPLMN}$ as specified in 3GPP TS 31.102 and ePDG identifier is provisioned in the ePDG configuration information, the UE shall use the configured IP address to select the ePDG, or if configured IP address is not available, use the configured FQDN and run DNS query to obtain the IP address(es) of the ePDG(s);

i) if an entry for the RPLMN is available in ePDG selection information, the UE constructs the ePDG FQDN based on configured FQDN format of the RPLMN as described in subclause 4.5.4.2 of 3GPP TS 23.402;

ii) if an entry for the RPLMN is not available in ePDG selection information, and an entry for its equivalent PLMN(s) as received in Attach Accept is available in ePDG selection information, the UE constructs the ePDG FQDN based on configured FQDN format of the equivalent PLMN as described in subclause 4.5.4.2 of 3GPP TS 23.402;

iii) if an entry for the RPLMN is not available in ePDG selection information, an entry of none of its equivalent PLMN(s) is available in ePDG selection information, construct ePDG FQDN based on the Operator Identifier FQDN format using the RLMN ID; and 2) if the UE received:

- an FQDN, then the UE shall use that FQDN; or

- an IP address the UE shall use the IP address; or b) if the UE is not-in the Updated state as specified in 3GPP TS 23.122 or the UE is in the Updated state as specified in 3GPP TS 23.122: and an ePDG selection indicator was not received from the non-access stratum layer as defined in 3GPP TS 24.301 and If Home ePDG identifier is i) provisioned in the ePDG configuration information, the UE shall use the configured IP address to select the ePDG, or if configured IP address is not available, use the configured FQDN and run DNS query to obtain the IP address(es) of the ePDG(s).

ii) not provisioned in the ePDG configuration information, the UE proceeds as follows:

a) if the UE is ~~attached~~in the Updated state as specified in 3GPP TS 23.122 to a RPLMN via 3GPP access and the RPLMN MCC, MNC does not matches the MCC MNC of the IMSI stored in the $EF_{IMSI}$ or $EF_{EHPLMN}$ as specified in 3GPP TS 31.102:

1) if an entry for the ~~V~~RPLMN is available in ePDG selection information, the UE shall construct ePDG FQDN based on configured FQDN format of the RPLMN as described in subclause 4.5.4.2 of 3GPP TS 23.402;

2) if an entry for the ~~V~~RPLMN is not available in ePDG selection information, and an entry for its equivalent PLMN(s) is available in ePDG selection information, the UE shall construct ePDG FQDN based on configured FQDN format of the equivalent PLMN as described in subclause 4.5.4.2 of 3GPP TS 23.402;

3) if an entry for the ~~V~~RPLMN is not available in ePDG selection information, an entry of none of its equivalent PLMN(s) is available in ePDG selection information, and an 'Any_PLMN' entry is available in ePDG selection information, the UE shall construct ePDG FQDN based on configured FQDN format of 'Any_PLMN' entry as described in subclause 4.5.4.2 of 3GPP TS 23.402; and 4) if an entry for the ~~VR~~PLMN is not available in ePDG selection information, an entry of none of its equivalent PLMN(s) is available in ePDG selection information, and an 'Any_PLMN' entry is not available in ePDG selection information, the UE shall construct ePDG FQDN based on the Operator Identifier FQDN format using the PLMN ID of the HPLMN as described in subclause 4.5.4.2 of 3GPP TS 23.402;

and the UE shall use the DNS server function to resolve the constructed ePDG FQDN to the IP address(es) of the ePDG(s); and b) if the UE is <u>in the Updated state as specified in 3GPP TS 23.122 and the RPLMN MCC, MNC matches the MCC MNC of the IMSI stored in the $EF_{IMSI}$ or $EF_{EHPLMN}$ as specified in 3GPP TS 31.102</u> ~~attached to the HPLMN~~ via 3GPP access or the UE is not ~~attached~~ in <u>the Updated state as specified in 3GPP TS 23.122</u> to a PLMN via 3GPP access:

1) if the UE is attached to the HPLMN:

i) if an entry for the HPLMN is available in ePDG selection information, the UE shall construct ePDG FQDN based on configured FQDN format of HPLMN as described in subclause 4.5.4.2 of 3GPP TS 23.402;

ii) if an entry for the HPLMN is not available in ePDG selection information, and an entry for its equivalent HPLMN(s) is available in ePDG selection information, the UE shall construct ePDG FQDN based on configured FQDN format of its equivalent HPLMN as described in subclause 4.5.4.2 of 3GPP TS 23.402; and iii) if an entry for the HPLMN is not available in ePDG selection information, and an entry of none of its equivalent HPLMN(s) is available in ePDG selection information, the UE shall construct ePDG FQDN based on the Operator Identifier FQDN format using the PLMN ID of the HPLMN as described in subclause 4.5.4.2 of 3GPP TS 23.402; and 2) if the UE is not attached to a PLMN, the UE shall construct ePDG FQDN based on the Operator Identifier FQDN format using the PLMN ID of the HPLMN as described in > subclause 4.5.4.2 of 3GPP TS 23.402;
>
> and the UE shall use the DNS server function to resolve the constructed ePDG FQDN to the IP address(es) of the ePDG(s).
>
> Editor's note (WID: SAES4-non3GPP, CR#0426): How the UE determines the entry of HPLMN in ePDG configuration information is FFS.
>
> If the ePDG configuration information is not configured on the UE, or the ePDG configuration information is configured but empty, then the UE shall construct the ePDG FQDN based on the Operator Identifier FQDN format using the PLMN ID of the HPLMN stored on the USIM, and the UE shall use the DNS server function to resolve the constructed ePDG FQDN to the IP address(es) of the ePDG(s).
>
> If selecting an ePDG in the VPLMN that the UE is attached to fails:
>
> a) if the ePDG selection policy for the VPLMN indicates that selection of an ePDG in the VPLMN is preferred, the UE shall construct the ePDG FQDN based on the Operator Identifier FQDN format using the PLMN ID of the HPLMN as described in subclause 4.5.4.2 of 3GPP TS 23.402. The UE shall use the DNS server function to resolve the constructed ePDG FQDN to the IP address(es) of the ePDG(s); and
>
> b) if the ePDG selection policy for the VPLMN indicates that selection of an ePDG in the VPLMN is mandatory, the UE shall stop the ePDG selection.
>
> If selecting an ePDG in the HPLMN fails, and the selection of ePDG in the HPLMN is performed using Home ePDG identifier configuration and there are more pre-configured ePDGs in the HPLMN, the UE shall repeat the tunnel establishment attempt using the next FQDN or IP address(es) of the ePDG in the HPLMN.
>
> Editor's note (WID: SAES4-non3GPP, CR#0426): Update to the ePDG selection procedure may be needed to address legal interception requirement of the selected PLMN for WLAN from SA3-LI in the future.

Table 10 – Proposed changes to 3GPP TS 24.302 based on C1-153983

Table 11 – Proposed changes to 3GPP TS 24.302 based on C1-153983

7.2.1 Selection of the ePDG

The UE performs ePDG selection based on the ePDG configuration information configured by the home operator in the UE either via H-ANDSF or via USIM or via implementation specific means. The ePDG configuration information may consist of home ePDG identifier or ePDG selection information or both:

- when configured via H-ANDSF, the ePDG configuration information is provisioned in ePDG node under Home Network Preference as specified in 3GPP TS 24.312; and
- when configured via USIM, the ePDG configuration information is provisioned in $EF_{ePDGId}$ and $EF_{ePDGSelection}$ files as specified in 3GPP TS 31.102.

NOTE 1: Implementation specific means apply only if the configurations via H-ANDSF and USIM are not present.

The UE shall support the implementation of standard DNS mechanisms in order to retrieve the IP address(es) of the ePDG. The input to the DNS query is an ePDG FQDN as specified in subclause 4.4.3 and in 3GPP TS 23.003.

The UE proceeds as follows:

a) if the UE is ~~attached~~ in the Updated state as specified in 3GPP TS 23.122; and an ePDG selection indicator was received from the non-access stratum layer as defined in 3GPP TS 24.301 and the ePDG selection indicator indicates IMS voice over WLAN is supported then the UE shall:

1) if ePDG selection indicator was an indication e.g single bit that ePDG selection should be performed in the RPLMN, then:

i) if the RPLMN MCC, MNC matches the MCC MNC of the IMSI stored in the $EF_{IMSI}$ or $EF_{EHPLMN}$ as specified in 3GPP TS 31.102 and ePDG identifier is provisioned in the ePDG configuration information, the UE shall use the configured IP address to select the ePDG, or if configured IP address is not available, use the configured FQDN and run DNS query to obtain the IP address(es) of the ePDG(s);

i) if an entry for the RPLMN is available in ePDG selection information, the UE constructs the ePDG FQDN based on configured FQDN format of the RPLMN as described in subclause 4.5.4.2 of 3GPP TS 23.402;

ii) if an entry for the RPLMN is not available in ePDG selection information, and an entry for its equivalent PLMN(s) as received in Attach Accept is available in ePDG selection information, the UE constructs the ePDG FQDN based on configured FQDN format of the equivalent PLMN as described in subclause 4.5.4.2 of 3GPP TS 23.402;

iii) if an entry for the RPLMN is not available in ePDG selection information, an entry of none of its equivalent PLMN(s) is available in ePDG selection information, construct ePDG FQDN based on the Operator Identifier FQDN format using the RLMN ID; and 2) if the UE received:
 - an FQDN, then the UE shall use that FQDN; or
 - an IP address the UE shall use the IP address; or b) if the UE is not in the Updated state as specified in 3GPP TS 23.122 or the UE is in the Updated state as specified in 3GPP TS 23.122: and an ePDG selection indicator was not received from the non-access stratum layer as defined in 3GPP TS 24.301 or and an ePDG selection indicator was received from the non-access stratum layer as defined in 3GPP TS 24.301 and the ePDG selection indicator indicates IMS voice over WLAN is not supported and If Home ePDG identifier is i) provisioned in the ePDG configuration information, the UE shall use the configured IP address to select the ePDG, or if configured IP address is not available, use the configured FQDN and run DNS query to obtain the IP address(es) of the ePDG(s).

ii) not provisioned in the ePDG configuration information, the UE proceeds as follows:

a) if the UE is ~~attached~~ in the Updated state as specified in 3GPP TS 23.122 to a RPLMN via 3GPP access and the RPLMN MCC, MNC does not matches the MCC MNC of the IMSI stored in the $EF_{IMSI}$ or $EF_{EHPLMN}$ as specified in 3GPP TS 31.102:

1) if an entry for the ~~V~~RPLMN is available in ePDG selection information, the UE shall construct ePDG FQDN based on configured FQDN format of the RPLMN as described in subclause 4.5.4.2 of 3GPP TS 23.402;

2) if an entry for the ~~V~~RPLMN is not available in ePDG selection information, and an entry for its equivalent PLMN(s) is available in ePDG selection information, the UE shall construct ePDG FQDN based on configured FQDN format of the equivalent PLMN as described in subclause 4.5.4.2 of 3GPP TS 23.402;

3) if an entry for the ~~V~~RPLMN is not available in ePDG selection information, an entry of none of its equivalent PLMN(s) is available in ePDG selection information, and an 'Any_PLMN' entry is available in ePDG selection information, the UE shall construct ePDG FQDN based on configured FQDN format of 'Any_PLMN' entry as described in subclause 4.5.4.2 of 3GPP TS 23.402; and 4) if an entry for the ~~VR~~PLMN is not available in ePDG selection information, an entry of none of its equivalent PLMN(s) is available in ePDG selection information, and an 'Any_PLMN' entry is not available in ePDG selection information, the UE shall construct ePDG FQDN based on the Operator Identifier FQDN format using the PLMN ID of the HPLMN as described in subclause 4.5.4.2 of 3GPP TS 23.402;

and the UE shall use the DNS server function to resolve the constructed ePDG FQDN to the IP address(es) of the ePDG(s); and b) if the UE is <u>in the Updated state as specified in 3GPP TS 23.122 and the RPLMN MCC, MNC matches the MCC MNC of the IMSI stored in the $EF_{IMSI}$ or $EF_{EHPLMN}$ as specified in 3GPP TS 31.102</u>~~attached to the HPLMN~~ via 3GPP access or the UE is not ~~attached~~<u>in the Updated state as specified in 3GPP TS 23.122</u> to a PLMN via 3GPP access:

1) if the UE is attached to the HPLMN:

i) if an entry for the HPLMN is available in ePDG selection information, the UE shall construct ePDG FQDN based on configured FQDN format of HPLMN as described in subclause 4.5.4.2 of 3GPP TS 23.402;

ii) if an entry for the HPLMN is not available in ePDG selection information, and an entry for its equivalent HPLMN(s) is available in ePDG selection information, the UE shall construct ePDG FQDN based on configured FQDN format of its equivalent HPLMN as described in subclause 4.5.4.2 of 3GPP TS 23.402; and iii) if an entry for the HPLMN is not available in ePDG selection information, and an entry of none of its equivalent HPLMN(s) is available in ePDG selection information, the UE shall construct ePDG FQDN based on the Operator Identifier FQDN format using the PLMN ID of the HPLMN as described in subclause 4.5.4.2 of 3GPP TS 23.402; and 2) if the UE is not attached to a PLMN, the UE shall construct ePDG FQDN based on the Operator Identifier FQDN format using the PLMN ID of the HPLMN as described in > subclause 4.5.4.2 of 3GPP TS 23.402;
>
> and the UE shall use the DNS server function to resolve the constructed ePDG FQDN to the IP address(es) of the ePDG(s).
>
> Editor's note (WID: SAES4-non3GPP, CR#0426): How the UE determines the entry of HPLMN in ePDG configuration information is FFS.
>
> If the ePDG configuration information is not configured on the UE, or the ePDG configuration information is configured but empty, then the UE shall construct the ePDG FQDN based on the Operator Identifier FQDN format using the PLMN ID of the HPLMN stored on the USIM, and the UE shall use the DNS server function to resolve the constructed ePDG FQDN to the IP address(es) of the ePDG(s).
>
> If selecting an ePDG in the VPLMN that the UE is attached to fails:
>
> a) if the ePDG selection policy for the VPLMN indicates that selection of an ePDG in the VPLMN is preferred, the UE shall construct the ePDG FQDN based on the Operator Identifier FQDN format using the PLMN ID of the HPLMN as described in subclause 4.5.4.2 of 3GPP TS 23.402. The UE shall use the DNS server function to resolve the constructed ePDG FQDN to the IP address(es) of the ePDG(s); and
>
> b) if the ePDG selection policy for the VPLMN indicates that selection of an ePDG in the VPLMN is mandatory, the UE shall stop the ePDG selection.
>
> If selecting an ePDG in the HPLMN fails, and the selection of ePDG in the HPLMN is performed using Home ePDG identifier configuration and there are more pre-configured ePDGs in the HPLMN, the UE shall repeat the tunnel establishment attempt using the next FQDN or IP address(es) of the ePDG in the HPLMN.
>
> Editor's note (WID: SAES4-non3GPP, CR#0426): Update to the ePDG selection procedure may be needed to address legal interception requirement of the selected PLMN for WLAN from SA3-LI in the future.

Table 11 – Proposed changes to 3GPP TS 24.302 based on C1-153983

Table 12 - Proposed changes to Wi-Fi Alliance Hotspot 2.0 (Release 2) Technical Specification Version 1.0.1.

*Table 5: HS2.0 ANQP-element Subtype Definition*

| Element Name | Subtype Value | Description (section) | Extensible |
|---|---|---|---|
| Reserved | 0 | n/a | |
| ePDG selection indicator list | 12 | 4.X | |
| Reserved | 13-255 | n/a | |

........

*Table 6: HS2.0 ANQP-element Usage*

| ANQP-element Name | ANQP-Element (subclause) | ANQP-element type | AP | Mobile Device |
|---|---|---|---|---|
| ePDG selection indicator list | 4.X | S | T | R |
| Symbols | | | | |
| Q     element is an ANQP Query | | | | |
| S     element is an ANQP Response | | | | |
| T     ANQP-element may be transmitted by MAC entity | | | | |
| R     ANQP-element may be received by MAC entity | | | | |

4.X. ePDG selection indicator list element

The ePDG selection indicator list element provides information about ePDG selection indicator information available within the IEEE 802.11 AN. The ePDG selection indicator element may include one of more of the following:

- IP address of an ePDG
- FQDN of an ePDG
- NAI Realm
- PLMN ID

The format of the ePDG selection indicator list element is provided in Figure 4.X.1

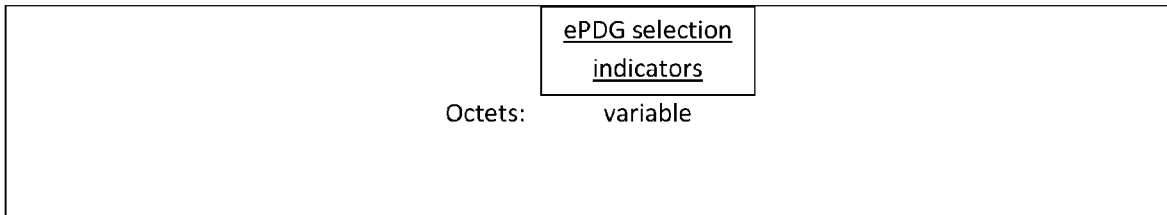

Figure 4.X.1 – ePDG selection indicator list element format

The ePDG Selection Indicators field contains one or more variable length ePDG Selection Indicator fields.

The format of each ePDG selection indicator field is provided in Figure 4.X.2.

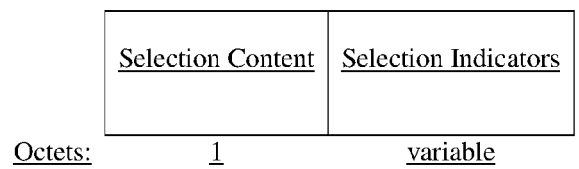

Figure 4.X.2 – ePDG selection indicator field format

The Selection Content is a 1-octet subfield whose value indicates what additional information can be found in each Selection Indicator sub-field:

| Meaning | bit |
|---|---|
| IP address of epDG | 0 |
| FQDN of ePDG | 1 |
| NAI Realm | 2 |
| PLMN ID | 3 |
| Reserved | 4-15 |

The Selection Indicators field contains one or more Selection Indicator 1-octet subfields, each of which corresponds to a set bit within the Selection Content subfield. For example if bits 1 and 3 are equal to 1 within the Selection Content field, then the Selection Indicators field contains the Selection Indicator #2 and Selection Indicator #4 subfields.

The format of the Selection Indicator subfields is defined as follows.

Selection Indicator #1 is a variable length octet subfield. It contains the IP address of the ePDG.

| Meaning | Octet |
|---|---|
| Length | 1 |
| IP type IPv4 | 2 bit 0 |
| IP type IPv6 | 2 bit 1 |
| Reserved | 2 bits 2-7 |
| IP address | variable |

If bit 0 is equal to 1 in octet 2, this indicates an IPv4 address and octets 3 to octet 6 contain that IPv4 address. Bit 8 of octet 6 represents the most significant bit of the IP address and bit 1 of octet 3 the least significant bit.

If bit 1 is equal to 1 in octet 2, this indicates an IPv6 address and octets 3 to octet 18 contain that IPv6 address. Bit 8 of octet 18 represents the most significant bit of the IP address and bit 1 of octet 3 the least significant bit.

Selection Indicator #2 is a variable length octet subfield. It contains a 1-octet length field and a Fully Qualified Domain Name or the NAI Realm address(es) of the ePDG. The format of the field is same as that in IEEE 802.11-2012 subsection 8.4.4.10 except that the EAP methods are not included.

The format of the Selection Indicator #3 is same as that in IEEE 802.11-2012 subsection 8.4.4.10 (NAI Realm), except the Info ID field.

The format of the Selection Indicator #4 is same as that in IEEE 802.11-2012 subsection 8.4.4.11 (3GPP Cellular Network), except the Info ID field.

Table 12 - Proposed changes to Wi-Fi Alliance Hotspot 2.0 (Release 2) Technical Specification Version 1.0.1

Table 13 – Proposed changes to 3GPP TS 24.302

---

6.5A  ePDG configuration 6.5A.1  UE Procedures 3-4)  If:

a) the UE supports the "Configuration request";

b) the EAP-Request/AKA'-Challenge message includes the AT_ePDG_REQUEST_SUPPORTED attribute as described in subclause 8.2.X.1 wherein the message field as described in subclause 8.1.4.1:

1) contains the message type field indicating ePDG_REQUEST_SUPPORTED; and 2) contains the type field including the ePDG Request Supported field item as described in subclause 8.2.X.1 indicating ePDG Supported; and c) the UE requests usage of the "ePDG";

5-6)  then the UE:

a) shall include the AT_ePDG_REQUEST attribute according to subclause 8.2.X.2 in the EAP-Response/AKA'-Challenge message. In the message field according to subclause 8.1.4.1 of the AT_ePDG_REQUEST attribute, the UE shall:

1) set the message type field to ePDG_REQUEST; and 2) contains the type field including the EPDG Request field item as described in subclause 8.2.X.2 indicating EPDG address requested; and 7-8) Upon receiving the EAP-Request/AKA'-Notification message including the AT_EPDG_RESP attribute as described in subclause 8.2.X.3 where the message field as described in subclause 8.1.4.1:

- contains the message type field indicating EPDG_RESP; and

- contains the field EPDG Encoded;

the UE:

- store the ePDG address to be used to create the bearer (IPSec tunnel) to an ePDG.

If this message is received in EAP-AKA' signalling used in tunnel set-up to an ePDG, the received ePDG address shall be considered an alternative ePDG address to use by the UE and the UE shall start the ePDG set-up procedure again using this new received address.

6.5A.2 AAA Procedures

The 3GPP AAA server may support EPDG configuration.

3-4) If the network supports EPDG configuration, the 3GPP AAA server shall include a) in the EAP-Request/AKA'-Challenge message includes the AT_EPDG_REQUEST_SUPPORTED attribute as described in subclause 8.2.X.1 wherein the message field as described in subclause 8.1.4.1:

1) contains the message type field indicating EPDG_REQUEST_SUPPORTED; and 2) contains the type field including the EPDG Request Supported field_item as described in subclause 8.2.X.1 indicating EPDG Supported; and 5-6) If the 3GPP AAA server supports EPDG configuration; and the AAA server receives the AT_EPDG_REQUEST attribute according to subclause 8.2.X.2 in the EAP-Response/AKA'-Challenge message. In the message field according to subclause 8.1.4.1 of the AT_EPDG_REQUEST attribute, the following are:

1) set the message type field to EPDG_REQUEST; and 2) contains the type field including the EPDG Request field_item as described in subclause 8.2.X.2 indicating EPDG address_requested; and Then the AAA server optionally contacts an external database e.g. HSS, PCRF to obtain an EPDG address to be used and provides that address in the EAP-RSP/AKA'-identity message. (SEE solution 6.1. for solution how AAA can contact PCRF)

7-8) The AAA sends the EAP-Request/AKA'-Notification message including the AT_EPDG_RESP attribute as described in subclause 8.2.X.3 where the message field as described in subclause 8.1.4.1:

- contains the message type field indicating EPDG_RESP; and

- contains the field ePDG Encoded as described in subclause 8.2.x.3.2;

8.1.4.1 Message

The message is coded according to figure 8.1.4.1-1 and table 8.1.4.1-1.

Table 8.1.4.1-2: Message type

The value is coded as follows.

| 7 | 6 | 5 | 4 | 3 | 2 | 1 | 0 |   |
|---|---|---|---|---|---|---|---|---|
| 0 | 0 | 0 | 0 | 0 | 0 | 0 | 1 | CONNECTION_CAPABILITY |
| 0 | 0 | 0 | 0 | 0 | 0 | 1 | 0 | SCM_REQUEST |
| 0 | 0 | 0 | 0 | 0 | 0 | 1 | 1 | SCM_RESPONSE |
| 0 | 0 | 0 | 0 | 0 | 1 | 0 | 0 | MCM_REQUEST |
| 0 | 0 | 0 | 0 | 0 | 1 | 0 | 1 | MCM_RESPONSE |
| 0 | 0 | 0 | 0 | 0 | 1 | 1 | 1 | EPDG_REQUEST_SUPPORTED |
| 0 | 0 | 0 | 0 | 1 | 0 | 0 | 0 | EPDG_REQUEST |

8.2.X  Identity attributes 8.2.X.1 AT_EPDG_Request Supported attribute

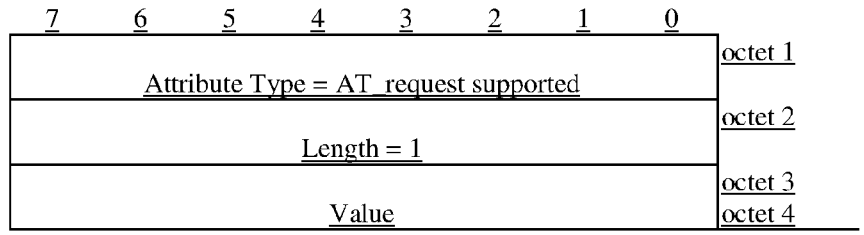

Figure 8.2.X.1-1: AT_EPDG_Request Supported attribute

Table 8.2.X.1-1: : AT_EPDG_Request Supported

Octet 1 indicates the type of attribute as AT_EPDG_Request Supported with a value of 1XX.

Octet 2 is the length of this attribute which shall be set to 1 as per IETF RFC 4187

Octet 3 and 4 is the value of the attribute. Octet 3 is reserved and shall be coded as zero. Octet 4 shall be set as follows. All other values are reserved.

| 7 | 6 | 5 | 4 | 3 | 2 | 1 | 0 |   |
|---|---|---|---|---|---|---|---|---|
| | | | | | | | | EPDG Request Supported field |
| 0 | 0 | 0 | 0 | 0 | 0 | 0 | 1 | EPDG Request Supported |
| 0 | 0 | 0 | 0 | 0 | 0 | 1 | 0 | EPDG Request not supported |

| 1 | 1 | 1 | 1 | 1 | 1 | 1 | 1 | Reserved |
|---|---|---|---|---|---|---|---|---|

8.2.X.2 AT_EPDG_Request attribute

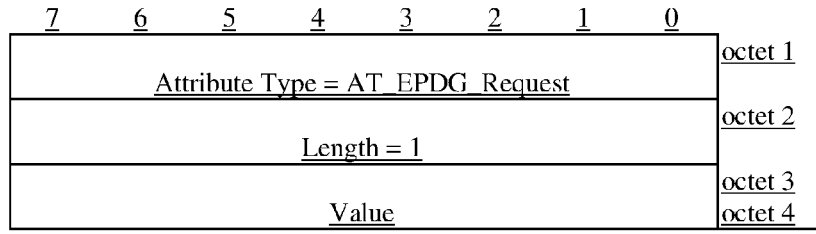

Figure 8.2.X.2-1: AT_EPDG_Request attribute

Table 8.2.X.2-1: : AT_EPDG_Request attribute

Octet 1 indicates the type of attribute as AT_EPDG_Request with a value of 1XX.

Octet 2 is the length of this attribute which shall be set to 1 as per IETF RFC 4187

Octet 3 and 4 is the value of the attribute. Octet 3 is reserved and shall be coded as zero. Octet 4 shall be set as follows. All other values are reserved.

| 7 | 6 | 5 | 4 | 3 | 2 | 1 | 0 | EPDG_requested field |
|---|---|---|---|---|---|---|---|---|
| 0 | 0 | 0 | 0 | 0 | 0 | 0 | 1 | EPDG address requested |
| 0 | 0 | 0 | 0 | 0 | 0 | 1 | 0 | Reserved to |
| 1 | 1 | 1 | 1 | 1 | 1 | 1 | 1 | Reserved |

8.2.X.3 AT_EPDG_RESP attribute

8.2.X.3.1  General

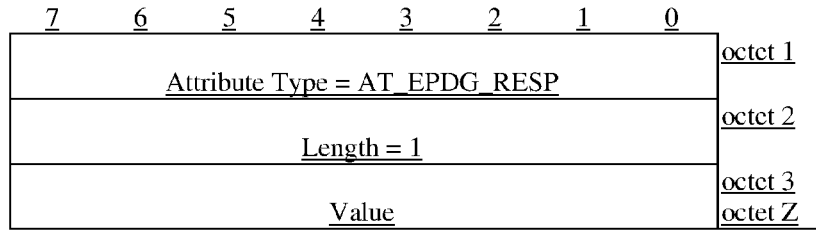

Figure 8.2.X.3-1: AT_EPDG_RESP attribute

8.2.x.3.2  ePDG encoded

There may be multiple ePDG encoded in the AT_EPDG_RESP_attribute.

| 7 | 6 | 5 | 4 | 3 | 2 | 1 | 0 |
|---|---|---|---|---|---|---|---|

| | octet 1 |
|---|---|
| ePDG encoded | |
| Length = 1 | octet 2 |
| EPDG | octet 3 |
| | octet Z |

Figure 8.2.X.3-1: AT_EPDG_RESP attribute Value

Table 8.2.X.3-1: : AT_EPDG_RESP attribute Value

Octet 1 indicates the identity that is encoded. .

Octet 1 shall be set as follows. All other values are reserved.

| 7 | 6 | 5 | 4 | 3 | 2 | 1 | 0 | |
|---|---|---|---|---|---|---|---|---|
| | | | | | | | | EPDG Encoded |
| 0 | 0 | 0 | 0 | 0 | 0 | 0 | 1 | EPDG FQDN Encoded |
| 0 | 0 | 0 | 0 | 0 | 0 | 1 | 0 | ePDG IPv4 encoded |
| 0 | 0 | 0 | 0 | 0 | 0 | 1 | 1 | ePDG IPv6 encoded |
| 0 | 0 | 0 | 0 | 0 | 1 | 0 | 0 | Reserved to |
| 0 | 0 | 0 | 0 | 0 | 1 | 1 | 1 | Reserved |

8.2.x.3.3        EPDG

The EPDG field is an octet string encoded according to UTF-8 encoding rules containing an FQDN or an IP address.

Table 13 – Proposed changes to 3GPP TS 24.302

Table 14 – Proposed changes to 3GPP TS 23.402

---

4.5.4.3 UE Configuration by HPLMN

The UE may be configured (e.g. via H-ANDSF, USIM, etc.) by the HPLMN with the following configuration, whose usage is defined in clause 4.5.4.4:

1) ePDG identifier configuration: It contains the FQDN or IP address of an ePDG in the HPLMN.

NOTE 1: The FQDN in the ePDG identifier configuration may have a different format than the one described in clause 4.5.4.2.

2) ePDG selection information: It contains a list of PLMNs (optionally including the HPLMN) and for each PLMN it indicates whether the selection of an ePDG in this PLMN is preferred or mandatory. It also indicates if selection of an ePDG in this PLMN should be based on Tracking/Location Area Identity FQDN or on Operator Identifier FQDN, as specified in clause 4.5.4.4.

3) <u>LI policy: it contains a list of PLMNs and for each PLMN it indicates whether the selection of an ePDG, if indicated by that PLMN entry via an Attach Accept should be "followed" or "ignored".</u>

The ePDG selection information may include an "any PLMN" entry, which matches any PLMN the UE is attached to. If the ePDG selection information contains both the "any PLMN" and the PLMN the UE is attached to, the UE shall give precedence to the latter.

4.5.4.4 UE ePDG Selection Procedure

When constructing an FQDN, the UE shall construct the FQDN as described in clause 4.5.4.2.

<u>If the UE receives</u> a) <u>an indication from the lower layers that IMS voice over WLAN Session Supported Indication is supported by the RPLMN (see 3GPP TS 23.401 sub-clause 4.3.5.8b), and if the RPLMN is not in the LI Policy information as defined in point 3) in clause 4.5.4.3 or the RPLMN is in the Li Policy information as defined in point 3) and has an entry of "mandatory" then</u> i) <u>If the UE is attached via 3GPP access to a PLMN that</u>

A) <u>is in the ePDG selection information defined in point 2) in clause 4.5.4.3 (including the</u> case when there is "any PLMN" value in the ePDG selection information), the UE shall select the ePDG in the PLMN by constructing an FQDN as described in clause 4.5.4.2, and using the DNS server function to obtain the IP address(es) of the ePDG(s) in the PLMN; or B) Not in the ePDG selection information defined in point 2) in clause 4.5.4.3 then the UE shall select the ePDG in the PLMN by constructing an operator identifier FQDN and using the DNS server function to obtain the IP address(es) of the ePDG(s) in the PLMN; or ii) Received an A) FQDN address, then the UE shall use that FQDN in the DNS server request to obtain the IP address(es) of the ePDG(s) in the PLMN; or B) IP address then the UE shall use that IP address to set-up an IPSec tunnel to the ePDG.

iii) In all other cases, including the UE not attached to any PLMN via 3GPP access, the UE shall select the ePDG of the HPLMN by constructing the FQDN according to clause 4.5.4.2, and use the DNS server function to obtain the IP address(es) of the ePDG(s) in the HPLMN. If no HPLMN or "any PLMN" value is present in the ePDG selection information, the UE construct the Operator Identifier FQDN for HPLMN; or b) does not receive an indication from the lower layers or received an indication from the lower layers and the RPLMN is in the LI Policy information as defined in point 3) and has an entry of "optional" then the UE shall perform ePDG selection by executing the steps below in the following order:

1) If the UE is configured with an FQDN or IP address in the ePDG identifier configuration defined in point 1) in clause 4.5.4.3, then the UE shall attempt to select in ePDG in the HPLMN. The UE shall either use the configured FQDN and use the DNS server function to obtain the IP address(es) of the ePDG(s) in the HPLMN, or the UE shall use the configured IP address.

2) If the UE is attached via 3GPP access to a PLMN-x and (a) PLMN-x is included in the ePDG selection information defined in point 2) in clause 4.5.4.3, or (b) PLMN-x is not included in the ePDG selection information but the ePDG selection information includes the "any PLMN" entry, > then the UE shall attempt to select an ePDG in this PLMN-x. The UE shall construct an ePDG FQDN for this PLMN-x as described in clause 4.5.4.2, and shall use the DNS server function to obtain the IP address(es) of the ePDG(s).
>
> 2a)If the UE has performed "3GPP-based access authentication" (see e.g. subclause 4.8.2b) with a PLMN that is in the ePDG selection information defined in point 2) in clause 4.5.4.3 (including the case when there is "any PLMN" value in the ePDG selection information), the UE shall select the ePDG in the PLMN by constructing an FQDN as described in clause 4.5.4.2, and using the DNS server function to obtain the IP address(es) of the ePDG(s) in the PLMN; otherwise.
>
> 3) In all other cases, including the case when the UE is not attached to any PLMN via 3GPP access, the UE shall attempt to select an ePDG in the HPLMN. The UE shall construct an ePDG FQDN for the HPLMN according to clause 4.5.4.2, and shall use the DNS server function to obtain the IP address(es) of the ePDG(s). If no HPLMN or "any PLMN" entry is present in the ePDG selection information, the UE shall construct the Operator Identifier FQDN for HPLMN.
>
> NOTE 1: According to the steps above, the home operator can configure the UE to always select an ePDG in the HPLMN, for example, by:
>
> - providing neither the ePDG identifier configuration nor the ePDG selection information, in which case the UE always selects an ePDG in HPLMN by using the Operator Identifier FQDN, according to step 3) above; or
>
> - providing ePDG identifier configuration, in which case the UE always selects an ePDG in HPLMN based on the FQDN or IP address in the ePDG identifier configuration, according to step 1) above.
>
> NOTE 2: According to the steps above, the home operator can configure the UE to attempt first to select an ePDG in the VPLMN, for example, by:
>
> - not providing the ePDG identifier configuration, and
>
> - providing the ePDG selection information containing the "any PLMN" entry and the indication of "preferred".

Table 14 – Proposed changes to 3GPP TS 23.402

Table 15 – Proposed changes to 3GPP TS 24.312

4.2.X 5.11.xx *ANDSF*/HomeNetworkPreference/ePDG

/LI_Policy

The LI_Policy node acts as a placeholder for the list of the ePDGs in the UE's HPLMN.

- Occurrence: ZeroOrOne
- Format: node
- Access Types: Get, Replace
- Values: N/A 5.11.xx+1    *ANDSF*/HomeNetworkPreference/ePDG
/LI_Policy/<X>/

This interior node acts as a placeholder for the FQDN and/or IP address configuration of an ePDG in the UE's HPLMN.

- Occurrence: ZeroOrMore
- Format: node
- Access Types: Get, Replace
- Values: N/A 5.11. xx+2    *ANDSF*/HomeNetworkPreference/ePDG
/LI_Policy/<X>/Selection_policy The Selection_policy leaf indicates whether the selection of an ePDG in such VPLMN is preferred or mandatory.

- Occurrence: ZeroOrOne
- Format: bool
- Access Types: Get, Replace
- Values: 0, 1

0    Indicates that selection of an ePDG in this VPLMN is preferred but not mandatory (see 3GPP TS 24.302).

1 Indicates that selection of an ePDG in this VPLMN is mandatory (see 3GPP TS 24.302).

The default value 0 applies if this leaf is not provisioned.

5.11. xx+3 *ANDSF*/HomeNetworkPreference/ePDG /LI_Policy/<X>/Identity

The Identity interior node acts as a placeholder for the list of Identities that policy should apply to.

- Occurrence: ZeroOrMore
- Format: node
- Access Types: Get, Replace
- Values: N/A The absence of this leaf indicates that IP address is not configured for this ePDG in the UE's HPLMN by the home operator.

5.11. xx+4 *ANDSF*/HomeNetworkPreference/ePDG /LI_Policy/<X>/Identity/<X>

This interior node acts as a placeholder Identity that policy should apply to.

- Occurrence: ZeroOrMore
- Format: node
- Access Types: Get, Replace
- Values: N/A 5.11. xx+5 *ANDSF*/HomeNetworkPreference/ePDG /LI_Policy/<X>/Identity/<X>/IdentityType The AddressType leaf indicates the IP version of one IP address of an ePDG in the UE's HPLMN.

- Occurrence: One
- Format: chr
- Access Types: Get, Replace
- Values: 'IPv4', 'IPv6', "FQDN", "MCC", "PLMN ID", "NAI"

| 5.11. xx+6     *ANDSF*/HomeNetworkPreference/ePDG/L1_Policy/<X>/Identity/<X>/Identity |
|---|
| The Identity leaf indicates the identity. |
| - Occurrence: One |
| - Format: chr |
| - Access Types: Get, Replace |
| - Values: <an IPv4 address>, <an IPv6 address>, "FQDN", "MCC", "PLMN_ID", "NAI". |
| The value of this leaf is an |
| i) IPv4 address if the IdentityType leaf value is equal to IPv4; |
| ii) IPv6 address if the IdentityType leaf value is equal to IPv6. |
| iii) FQDN (see IETF RFC 1035) if the IdentityType leaf value is equal to FQDN and is a realm: |
|     a) as specified in 3GPP TS 23.003, subclause 19.2; or |
|     b) in the form of an FQDN as defined by IETF RFC 4282. |
| iv) PLMN ID if the IdentityType leaf value is equal to PLMN_ID and the format of the PLMN is defined by 3GPP TS 23.003. |
| v) NAI if the IdentityType leaf value is equal to NAI and an NAI is defined by RFC 4282. |

Table 15 – Proposed changes to 3GPP TS 24.312

Table 16 – DHCP Example 2. ePDG IPv4 Address Option for DHCPv4

This section describes the ePDG IPv4 Address Option for DHCPv4. The option layout is depicted below:

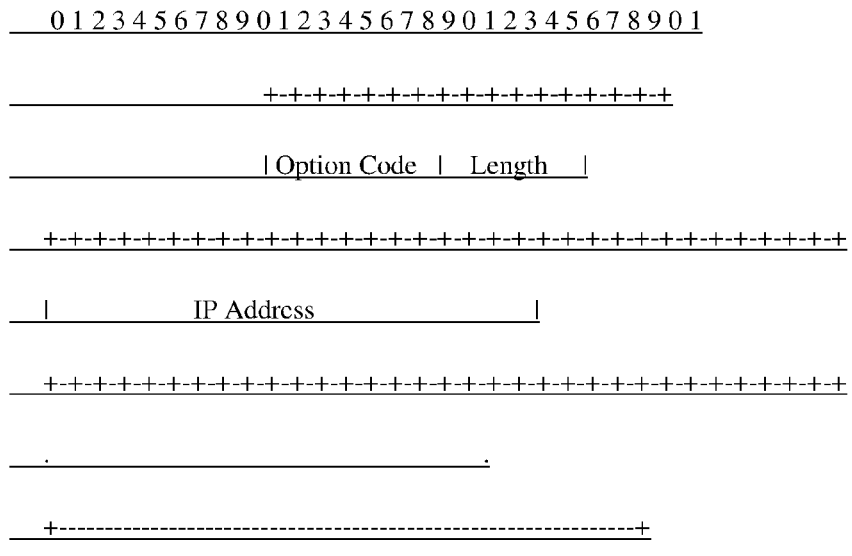

Option Code

OPTION-IPv4_Address-ePDG (XXX)

Length

Length (in bytes) of the option excluding the 'Option Code' and the 'Length' fields; 'Length' field is set to 4N, where N is the number of IPv4 addresses carried in the option IP Address IPv4 address(es) of ePDG server(s)

ePDG servers MUST be listed in order of preference, and the client SHOULD process them in decreasing order of preference.

3. ePDG IPv6 Address Option for DHCPv6

This section describes the ePDG IPv6 Address Option for DHCPv6. All values in the option are represented in network byte order. The option layout is depicted below:

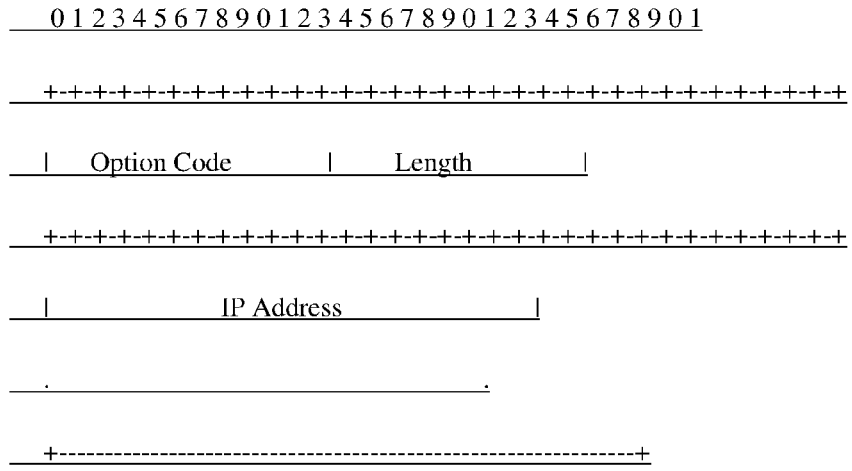

Option Code

OPTION-IPv6_Address-ePDG (YYY)

Length

Length (in bytes) of the option excluding the 'Option Code' and the 'Length' fields; 'Length' field is set to 16N, where N is the number of IPv6 addresses carried in the option IP Address IPv6 address(es) of ePDG server(s)

ePDG servers MUST be listed in order of preference, and the client SHOULD process them in decreasing order of preference.

4. Option Usage 4.1. Usage of ePDG Options for DHCPv4

The requesting and sending of the proposed DHCPv4 options follow the rules for DHCP options in [RFC2131].

4.1.1. Mobile Node Behavior

The mobile node MAY request the IP address of an ePDG server either during initial association with a network or when the mobile node determines that it needs to connect to an ePDG. It MAY also request the IP address of an ePDG server when the network information is outdated or the mobile node does not have any ePDG information.

In order to request an address of a ePDG server, the mobile node (DHCP client) MUST include an ePDG IPv4 Address Option in the Parameter Request List (PRL) in the respective DHCP messages as defined in [RFC2131] and [RFC2132]. The DHCP client MAY initiate a new DHCP exchange or piggyback on other DHCP message exchanges. DHCP client-handling PRL options are specified in [RFC2131], Section 4.4.

4.2. Usage of ePDG Options for DHCPv6

The requesting and sending of the proposed DHCPv6 options follow the rules for DHCP options in [RFC3315].

4.2.1. Mobile Node Behavior

The mobile node MAY request the IP address of an ePDG server according to the scenarios described in Section 4.1.1.

In order to discover the address of an ePDG server, the mobile node (DHCP client) MUST include an ePDG IPv6 Address Option in the Option Request Option (ORO) in the respective DHCP messages as defined in [RFC3315]. The DHCP client MAY initiate a new DHCP exchange or piggyback on other DHCP message exchanges. DHCP client-handling ORO options are specified in [RFC3315], Sections 17.1 and 18.1.

Table 16 – DHCP Example

Table 17 – Proposed changes to 3GPP TS 23.402

4.5.4 ePDG Selection 4.5.4.1 General

The UE performs ePDG selection based on a set of information configured by the HPLMN in the UE, and based on the UE's knowledge of the PLMN it is attached to.

A UE connected to one or multiple PDN GWs uses a single ePDG. In case of handover between ePDGs, the UE may be temporarily connected to two ePDGs.

4.5.4.2 ePDG FQDNs Construction

When the UE attempts to construct an FQDN for selecting an ePDG in a certain PLMN-x (either a VPLMN or the HPLMN), then the UE shall construct one of the following FQDN formats:

- Operator Identifier FQDN: The UE constructs the FQDN by using the PLMN-x ID as the Operator Identifier.

- Tracking/Location Area Identity FQDN: The UE constructs the FQDN by using the identity of the Tracking Area/Location Area it is located in (i.e. based on PLMN-x ID and TAC/LAC). The Tracking/Location Area Identity FQDN is used to support location-specific ePDG selection within a PLMN.

- <u>ePDG FQDN: The UE uses a provided FQDN as is, no construction needed.</u>

<u>Except for the "ePDG FQDN" format,</u> the ePDG FQDN formats are specified in 3GPP TS 23.003.

<u>When the "ePDG FQDN" format is not provisioned,</u> the UE selects one of the above FQDN formats as follows:

a) If the UE attempts to select an ePDG in the registered PLMN and the UE is configured to use for this PLMN the Tracking/Location Area Identity FQDN as defined in point 2) of sub-clause 4.5.4.3; and b) the UE knows the TAI/LAI of the area the UE it is located in (e.g. the TAI/LAI from the most recent Attach or TAU/LAU), then the UE constructs a Tracking/Location Area Identity FQDN. Otherwise the UE constructs the Operator Identifier FQDN.

Also, the UE constructs the Operator Identifier FQDN as a fallback in the case of failure of DNS resolution of a Tracking/Location Area Identity based FQDN.

4.5.4.3 UE Configuration By HPLMN

The UE may be configured (e.g. via H-ANDSF, USIM, etc.) by the HPLMN with the following configuration, whose usage is defined in clause 4.5.4.4:

1) ePDG identifier configuration: It contains the FQDN or IP address of an ePDG in the HPLMN.

NOTE 1: The FQDN in the ePDG identifier configuration may have a different format than the one described in clause 4.5.4.2.

2) ePDG selection information: It contains a list of PLMNs (optionally including the HPLMN) and for each PLMN it indicates whether the selection of an ePDG in:

- the HPLMN is preferred or mandatory; or

- this PLMN is preferred or mandatory.

It also indicates if selection of an ePDG in the PLMN should be based on Tracking/Location Area Identity FQDN or on Operator Identifier FQDN or whether an FQDN should be used, as specified in clause 4.5.4.4.

The ePDG selection information may include an "any PLMN" entry, which matches any PLMN the UE is attached to. The ePDG selection information may include one or more country code entries, the country code matching the MCC (Mobile country code) of the PLMN the UE is attached to. If the ePDG selection information contains both the "any PLMN" or country code matching the PLMN the UE is attached to and the PLMN the UE is attached to, the UE shall give precedence to the latter. If the ePDG selection information contains both the "any PLMN" and country code matching the PLMN the UE is attached to, the UE shall give precedence to the latter.

4.5.4.4 UE ePDG Selection Procedure

When constructing an FQDN, the UE shall construct the FQDN as described in clause 4.5.4.2.

The UE shall perform ePDG selection by executing the steps below in the following order:

1) If the UE is configured with an FQDN or IP address in the ePDG identifier configuration defined in point 1) in clause 4.5.4.3, then the UE shall attempt to select in ePDG in the HPLMN. The UE shall either use the configured FQDN and use the DNS server function to obtain the IP address(es) of the ePDG(s) in the HPLMN, or the UE shall use the configured IP address.

2) If the UE is attached via 3GPP access to a PLMN-x and (a) PLMN-x is included in the ePDG selection information and the ePDG selection information does not indicate that selection of an ePDG in the HPLMN is preferred or mandatory defined in point 2) in clause 4.5.4.3, or (b) PLMN-x is not included in the ePDG selection information but the ePDG selection information includes the country code matching the MCC of PLMN-x and the ePDG selection information does not indicated that selection of an ePDG in the HPLMN is preferred or mandatory; or (c) PLMN-x is not included in the ePDG selection information but the ePDG selection information includes the "any PLMN" entry and the ePDG selection information does not indicated that selection of an ePDG in the HPLMN is preferred or mandatory, then the UE shall attempt to select an ePDG in this PLMN-x. The UE shall construct an ePDG FQDN for this PLMN-x as described in clause 4.5.4.2, and shall use the DNS server function to obtain the IP address(es) of the ePDG(s).

3a) If the UE is not attached via 3GPP access to any PLMN but the UE is connected to WLAN access and has selected a service provider for 3GPP-based access authentication; and:

(a) the service provider is associated with a PLMN, and this PLMN or the MCC of this PLMN is included in the ePDG selection information defined in point 2) in clause 4.5.4.3;

(b) the service provider is associated with a PLMN, the ePDG selection information includes a three digit country code that matches the MCC of the service provider's PLMN;

(c) the service provider is associated with a PLMN, the ePDG selection information includes the "any PLMN" entry; or (d) the service provider is associated with an FQDN and this FQDN is included in the ePDG selection information defined in point 2) in clause 4.5.4.3, then the UE shall attempt to select an ePDG in this PLMN-x unless the ePDG selection information indicates that selection of an ePDG in the HPLMN is preferred or mandatory. The UE shall construct an ePDG FQDN for this PLMN-x as described in clause 4.5.4.2, and shall use the DNS server function to obtain the IP address(es) of the ePDG(s).

3b) If the UE is not attached via 3GPP access to any PLMN but the UE is connected to WLAN access and has not selected a service provider for 3GPP-based access authentication or the UE has not 3GPP-based access authentication successfully with a PLMN; and the UE knows the identity of the country it is in, i.e. the UE can derive the MCC-x;

(a) the ePDG selection information includes a three digit country code that matches the identity of the country (b) the ePDG selection information includes a PLMN, and the MCC of this matches the identity of the country;

(c) the service provider is associated with a PLMN, the ePDG selection information includes the "any PLMN" entry;

then the UE shall attempt to select an ePDG in with the ePDG selection information that matched, unless the ePDG selection information indicates that selection of an ePDG in the HPLMN is preferred or mandatory. The UE shall construct an ePDG FQDN for this PLMN-x as described in clause 4.5.4.2, and shall use the DNS server function to obtain the IP address(es) of the ePDG(s).

4) In all other cases, the UE shall attempt to select an ePDG in the HPLMN. The UE shall construct an ePDG FQDN for the HPLMN according to clause 4.5.4.2, and shall use the DNS server function to obtain the IP address(es) of the ePDG(s). If no HPLMN or "any PLMN" entry is present in the ePDG selection information, the UE shall construct the Operator Identifier FQDN for HPLMN.

When the UE fails to select an ePDG in a VPLMN, then:

- If the ePDG selection information for this VPLMN contains the "preferred" indication based on point 2) in clause 4.5.4.3, the UE shall select the ePDG in the HPLMN by constructing the FQDN as described in clause 4.5.4.2, and shall use the DNS server function to obtain the IP address(es) of the ePDG(s) in the HPLMN.

- If the PDG selection information for this VPLMN contains the "mandatory" indication, the UE shall stop the ePDG selection.

When the UE fails to select an ePDG in the HPLMN, then:

- The UE shall stop the ePDG selection.

If selected ePDG is not reachable from an untrusted non-3GPP access, the UE shall attempt to reach the next discovered ePDG, if available.

Table 17 – Proposed changes to 3GPP TS 23.402

Table 18 – Proposed changes to 3GPP TS 24.312

---

5.11.19 *ANDSF*/HomeNetworkPreference/ePDG/ePDGSelectionInformation

The ePDG Selection Information node acts as a placeholder for the ePDG FQDN format and selection information for a list of PLMNs.

- Occurrence: ZeroOrOne

- Format: node

- Access Types: Get, Replace

- Values: N/A

The ePDG Selection Information node is present and is not empty, the UE retrieves ePDG selection policy and FQDN format setting for a PLMN as follows:

- if configuration for the PLMN can be found, the UE applies or uses the corresponding configured information of the PLMN for ePDG selection;

- if configuration for the UE's PLMN ID cannot be found, but there exists a ANDSF/HomeNetworkPreference/ePDG/ePDGSelectionInformation/<X> node with the PLMN leaf set to a three digit country code value, and the three digit country code matches an MCC of a PLMN, the UE applies the configured information of the matching country code value for ePDG selection.

- if configuration for the UE's PLMN ID cannot be found and no three digit country code matched an MCC of a PLMN, but there exists a ANDSF/HomeNetworkPreference/ePDG/ePDGSelectionInformation/<X> node with the PLMN leaf set to"Any_PLMN" value, the UE applies the configured information of "Any PLMN" value for ePDG selection.

- if the UE is not attached via 3GPP access to any PLMN but the UE is connected to WLAN access and has selected a service provider for 3GPP-based access authentication, the service provider is associated with an FQDN and the FQDN matches the service provider's FQDN, the UE uses the corresponding configured information of the PLMN for ePDG selection.

In all other cases, including the cases where the ePDG Selection Information node is not present or the ePDG Selection Information node is present but empty, the UE considers that pre-configuration for the UE's PLMN does not exist. The UE selects the ePDG of the HPLMN as specified in 3GPP TS 24.302.

*** Next change ***

5.11.21 *ANDSF*/HomeNetworkPreference/ePDG/ePDGSelectionInformation/
<*X*>/PLMN

The PLMN leaf indicates a PLMN code.

- Occurrence: One

- Format: chr

- Access Types: Get, Replace

- Values: <PLMN>, <country code>, <FQDN> or 'Any_PLMN'

The format of the PLMN and the MCC are defined by 3GPP TS 23.003.

If the UE's PLMN ID is same as the PLMN value stored in the PLMN leaf, configuration for this PLMN from home operator is found.

*** Next change ***

5.11.22 *ANDSF*/HomeNetworkPreference/ePDG/ePDGSelectionInformation/
<*X*>/Selection_policy The Selection_policy leaf indicates whether the selection of an ePDG in such VPLMN is preferred or mandatory.

- Occurrence: ZeroOrOne

- Format: integer

- Access Types: Get, Replace

- Values: 0, 1, 2, 3

0  Indicates that selection of an ePDG in this VPLMN is preferred but not mandatory (see 3GPP TS 24.302).

1  Indicates that selection of an ePDG in this VPLMN is mandatory (see 3GPP TS 24.302).

2 Indicates that selection of an ePDG in this HPLMN is preferred but not mandatory (see 3GPP TS 24.302).

3 Indicates that selection of an ePDG in this HPLMN is mandatory (see 3GPP TS 24.302).

The default value 0 applies if this leaf is not provisioned.

*** Next change ***

5.11.23 *ANDSF*/HomeNetworkPreference/ePDG/ePDGSelectionInformation/<*X*>/FQDN_format The FQDN_format leaf indicates whether Operator Identifier FQDN format or location based FQDN format is used when the FQDN is constructed by the UE.

- Occurrence: ZeroOfOne

- Format: char

- Access Types: Get, Replace

- Values: 0, 1, <FQDN>

0 Indicates that Operator Identifier FQDN format is used (see 3GPP TS 24.302).

1 Indicates that location based FQDN format is used (see 3GPP TS 24.302).

Any other value that is a valid FQDN is used as ePDG FQDN duyring tunnel setup.

The default value 0 applies if this leaf is not provisioned.

The FQDN_format values 0 or 1 is used by the UE when constructing FQDN as follows:

- if location based FQDN format is to be used, the UE constructs the Tracking/Location Area identity FQDN using the PLMN ID of the PLMN the UE is attached to and TAC/LAC of the area that the UE is located in;

- otherwise the UE constructs the Operator Identifer FQDN using the PLMN ID of the PLMN the UE is attached to.

Table 18 – Proposed changes to 3GPP TS 24.312

Table 19 – Proposed changes to 3GPP TS 29.272

7.4.3 Permanent Failures

Errors that fall within the Permanent Failures category shall be used to inform the peer that the request has failed, and should not be attempted again. The Result-Code AVP values defined in Diameter Base Protocol RFC 3588 shall be applied. When one of the result codes defined here is included in a response, it shall be inside an Experimental-Result AVP and the Result-Code AVP shall be absent.

E.g.:

7.4.3.X DIAMETER_ERROR_PLMN_NOT_ALLOWED (5abc)

This result code shall be sent by the HSS to indicate that the subscriber is not allowed to obtain service within the MME or SGSN area.

Or:

7.4.3.X DIAMETER_ERROR_PLMN_NOT_ALLOWED (5abc)

This result code shall be sent by the HSS to indicate that the subscriber is not allowed to obtain service via this PLMN.

Or:

7.4.3.X DIAMETER_ERROR_LOCATION_NOT_ALLOWED (5abc)

This result code shall be sent by the HSS to indicate that the subscriber is not allowed to obtain service from the location where the UE is situated.

Or:

7.4.3.X DIAMETER_ERROR_COUNTRY_NOT_ALLOWED (5abc)

This result code shall be sent by the HSS to indicate that the subscriber is not allowed to obtain service from the country where the UE is situated.

Table 19 – Proposed changes to 3GPP TS 29.272

Table 22 – Proposed changes to 3GPP TS 24.302

---

7.4.1.2 Tunnel establishment not accepted by the network

During the tunnel establishment procedures, if the ePDG receives from the AAA Server the Authentication and Authorization Answer message with the Result code IE (as specified in 3GPP TS 29.273):

- [..];

- DIAMETER_ERROR_PLMN_NOT_ALLOWED, the ePDG shall include, in the IKE_AUTH response message to the UE, a Notify Payload with a Private Notify Message Type PLMN_NOT_ALLOWED as defined in subclause 8.1.2.

And:

8.1.2 IKEv2 Notify Message Type value 8.1.2.1 Generic

The IKEv2 Notify Message Type is specified in IETF RFC 5996 [28]. The value of Notify Message Type between 8192 and 16383 is reserved for private Error usage. Only the private IKEv2 Notify Message Type used for this specification is specified in this subclause.

8.1.2.2 Private Notify Message - Error Types

The Private Notify Message, Error Types defined in table 8.1.2.2-1 are error notifications which indicates an error while negotiating an IKEv2 SA for the PDN connection to the APN requested by the UE. Refer to table 8.1.2.2-1 for more details on what each error type means.

Table 8.1.2.2-1: Private Error Types

| Notify Message | Value | Descriptions |
|---|---|---|
| [..] | [..] | [..] |
| PLMN_NOT_ALLOWED | 110ab | Corresponds to:<br><br>-<br><br>DIAMETER_ERROR_ROAMING_NOT_ALLOWED Result code IE as specified in 3GPP TS 29.273 [17]; or<br><br>- Other scenarios when the UE requests service in a PLMN where the UE is not allowed to select this ePDG. |

| LOCATION_NOT_ALLOWED | 110ab | Scenarios when the UE requests service in a location where the UE is not allowed to not allowed to select this ePDG. |
|---|---|---|

The UE, upon receiving the second indication, e.g. "PLMN_NOT_ALLOWED":

7.2.2.2 Tunnel establishment not accepted by the network

[..]

If a Private Notify Message Type set to PLMN_NOT_ALLOWED is received from the any PLMN's ePDG and the UE authenticates the network, the UE should retry the authentication procedure with:

- if the UE has received an indication which denies the UE to attempt to select an ePDG in the HPLMN, an ePDG according to the ePDG selection procedure in subclause 7.2.1 and subclause 7.2.1A; or

- if the UE has received an indication which requires the UE to attempt to select an ePDG in the current PLMN's country (i.e. as indicated by the MCC value of the PLMN identity), an ePDG according to the ePDG selection procedure in subclause 7.2.1 and subclause 7.2.1A; or

- if the UE has not received an indication information relevant for the ePDG selection procedure, an ePDG in the current PLMN's country (i.e. as indicated by the MCC value of the PLMN identity); or

- if the UE has received an indication which allows the UE to attempt to select an ePDG in the HPLMN, an ePDG in the HPLMN.

Table 22 – Proposed changes to 3GPP TS 24.302

What is claimed is:

1. A method in a Domain Name Service (DNS) server for assisting a user equipment (UE) in selecting, via a non-3GPP access, a network function belonging to a registered Public Land Mobile Network (PLMN), the method comprising:
    receiving a first message from the UE, the first message including UE request capabilities, the UE request capabilities comprising a first indicator indicating the network function, wherein the network function is capable of terminating a secure tunnel with the UE via the non-3GPP access; and
    sending a second message to the UE, the second message including an indication that promotes the UE attempting to connect, via the non-3GPP access, to the registered PLMN using the network function belonging to the registered PLMN, wherein the registered PLMN is a PLMN with which the UE has registered via a 3GPP access.

2. The method of claim 1, wherein the UE request capabilities comprise a second indicator indicating one of a Voice over Wi-Fi (VoWiFi) and a Voice over Wireless Local Area Network (VoWLAN).

3. The method of claim 1, wherein the UE request capabilities comprise a second indicator indicating the network function is capable of connecting to an IP Multimedia Subsystem (IMS) network.

4. A Domain Name Service (DNS) server for assisting a user equipment (UE) in selecting, via a non-3GPP access, a network function belonging to a registered Public Land Mobile Network (PLMN), the DNS server comprising:
    a communication interface that:
        receives a first message from the UE, the first message including UE request capabilities, the UE request capabilities comprising an indicator indicating the network function, wherein the network function is capable of terminating a secure tunnel with the UE via the non-3GPP access; and
        sends a second message to the UE, the second message including an indication that promotes the UE attempting to connect, via the non-3GPP access, to the registered PLMN using the network function belonging to the registered PLMN, wherein the registered PLMN is a PLMN with which the UE has registered via a 3GPP access.

5. The DNS server of claim 4, wherein the UE request capabilities comprise a second indicator indicating one of a Voice over Wi-Fi (VoWiFi) and a Voice over Wireless Local Area Network (VoWLAN).

6. The DNS server of claim 4, wherein the UE request capabilities comprise a second indicator indicating the network function is capable of connecting to an IP Multimedia Subsystem (IMS) network.

7. A computer program product in a Domain Name Service (DNS) server for assisting a user equipment (UE) in selecting, via a non-3GPP access, a network function belonging to a registered Public Land Mobile Network (PLMN), the computer program product comprising:
    a non-transitory storage medium readable by a processing circuit and storing instructions for execution by the processing circuit for:
        receiving a first message from the UE, the first message including UE request capabilities, the UE request capabilities comprising an indicator indicating the network function, wherein the network function is capable of terminating a secure tunnel with the UE via the non-3GPP access; and
        sending a second message to the UE, the second message including an indication that promotes the UE attempting to connect, via the non-3GPP access, to the registered PLMN using the network function belonging to the registered PLMN, wherein the registered PLMN is a PLMN with which the UE has registered via a 3GPP access.

8. The computer program product of claim 7, wherein the UE request capabilities comprise a second indicator indicating one of a Voice over Wi-Fi (VoWiFi) and a Voice over Wireless Local Area Network (VoWLAN).

9. The computer program product of claim 7, wherein the UE request capabilities comprise a second indicator indicating the network function is capable of connecting to an IP Multimedia Subsystem (IMS) network.

10. The method of claim 1, wherein the non-3GPP access comprises a Wireless Local Area Network (WLAN) network.

11. The method of claim 1, wherein the registered PLMN comprises an Evolved Packet Data Gateway (ePDG).

12. The DNS server of claim 4, wherein the non-3GPP access comprises a Wireless Local Area Network (WLAN) network.

13. The DNS server of claim 4, wherein the registered PLMN comprises an Evolved Packet Data Gateway (ePDG).

14. The computer program product of claim 7, wherein the non-3GPP access comprises a Wireless Local Area Network (WLAN) network.

* * * * *